(12) United States Patent
Adams et al.

(10) Patent No.: US 10,366,692 B1
(45) Date of Patent: Jul. 30, 2019

(54) ACCESSORY FOR A VOICE-CONTROLLED DEVICE

(71) Applicant: Amazon Technologies, Inc., Seattle, WA (US)

(72) Inventors: Zoe Adams, Orange County, CA (US); Pete Klein, Tustin, CA (US); Derick Deller, Capistrano Beach, CA (US); Michael John Guarniere, Redondo Beach, CA (US); Alina Chen, Huntington Beach, CA (US); Apoorv Naik, San Diego, CA (US); Jeremy Daniel Johnson, Mission Viejo, CA (US); Aslan Appleman, Playa Vista, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/595,658

(22) Filed: May 15, 2017

(51) Int. Cl.
| | |
|---|---|
| *G06F 3/16* | (2006.01) |
| *H04M 3/51* | (2006.01) |
| *G10L 15/07* | (2013.01) |
| *G10L 15/22* | (2006.01) |
| *G10L 15/26* | (2006.01) |
| *G10L 17/22* | (2013.01) |
| *G06F 16/332* | (2019.01) |
| *G06F 16/632* | (2019.01) |

(52) U.S. Cl.
CPC ............ *G10L 15/265* (2013.01); *G06F 3/167* (2013.01); *G10L 15/22* (2013.01); *H04M 3/5166* (2013.01); *G06F 16/3329* (2019.01); *G06F 16/632* (2019.01); *G10L 15/07* (2013.01); *G10L 17/22* (2013.01); *G10L 2015/226* (2013.01); *H04M 2201/405* (2013.01)

(58) Field of Classification Search
None
See application file for complete search history.

(56) References Cited

U.S. PATENT DOCUMENTS 6,332,123 B1 * 12/2001 Kaneko ................. G06T 13/205
375/E7.083
6,572,431 B1 * 6/2003 Maa ......................... A63H 3/28
369/63

(Continued)

OTHER PUBLICATIONS

Office Action for U.S. Appl. No. 15/473,348, dated Dec. 22, 2017, Klein, "Accessory for a Voice-Controlled Device", 17 pages.

(Continued)

*Primary Examiner* — Marcus T Riley
(74) *Attorney, Agent, or Firm* — Lee & Hayes, P.C.

(57) ABSTRACT

This disclosure describes techniques and systems for encoding instructions in audio data that, when output on a speaker of a first device in an environment, cause a second device to output content in the environment. In some instances, the audio data has a frequency that is inaudible to users in the environment. Thus, the first device is able to cause the second device to output the content without users in the environment hearing the instructions. In some instances, the first device also outputs content, and the content output by the second device is played at an offset relative to a position of the content output by the first device.

20 Claims, 17 Drawing Sheets

(56) References Cited

U.S. PATENT DOCUMENTS

| | | | |
|---|---|---|---|
| 7,503,006 B2* | 3/2009 | Danieli | A63F 13/12 |
| | | | 463/42 |
| 8,666,528 B2* | 3/2014 | Harkness | H04H 20/31 |
| | | | 700/94 |
| 8,670,393 B2 | 3/2014 | Jain et al. | |
| 8,917,971 B2* | 12/2014 | Woods | H04N 5/765 |
| | | | 386/200 |
| 9,491,522 B1 | 11/2016 | Trollope et al. | |
| 9,558,733 B1 | 1/2017 | Korn | |
| 9,698,999 B2* | 7/2017 | Mutagi | H04L 12/281 |
| 9,858,927 B2* | 1/2018 | Williams | G06F 16/68 |
| 9,986,296 B2* | 5/2018 | Buchner | H04N 21/4788 |
| 10,133,546 B2* | 11/2018 | Hart | G06F 3/167 |
| 2002/0186676 A1 | 12/2002 | Milley et al. | |
| 2005/0216271 A1* | 9/2005 | Konig | G10L 15/22 |
| | | | 704/275 |
| 2005/0282603 A1 | 12/2005 | Parrott et al. | |
| 2008/0319563 A1 | 12/2008 | Shimizu et al. | |
| 2009/0150553 A1 | 6/2009 | Collart et al. | |
| 2010/0205628 A1 | 8/2010 | Davis et al. | |
| 2010/0280641 A1* | 11/2010 | Harkness | H04H 20/31 |
| | | | 700/94 |
| 2010/0312547 A1* | 12/2010 | Van Os | G10L 15/26 |
| | | | 704/9 |
| 2013/0152139 A1* | 6/2013 | Davis | H04N 21/482 |
| | | | 725/61 |
| 2013/0152147 A1 | 6/2013 | Toney, Jr. | |
| 2013/0170813 A1* | 7/2013 | Woods | H04N 5/765 |
| | | | 386/200 |
| 2013/0289983 A1* | 10/2013 | Park | G10L 15/26 |
| | | | 704/235 |
| 2013/0347018 A1* | 12/2013 | Limp | H04N 21/4826 |
| | | | 725/19 |
| 2014/0278438 A1* | 9/2014 | Hart | G06F 3/167 |
| | | | 704/275 |
| 2015/0025664 A1 | 1/2015 | Cory et al. | |
| 2015/0146885 A1* | 5/2015 | Fitzgerald | H04R 3/005 |
| | | | 381/98 |
| 2015/0154976 A1* | 6/2015 | Mutagi | H04L 12/281 |
| | | | 704/275 |
| 2015/0195620 A1* | 7/2015 | Buchner | H04N 21/4788 |
| | | | 725/141 |
| 2015/0317977 A1* | 11/2015 | Manjunath | G10L 17/00 |
| | | | 704/270 |
| 2016/0094894 A1* | 3/2016 | Inayatullah | H04H 60/31 |
| | | | 725/12 |
| 2016/0165286 A1 | 6/2016 | Zhang et al. | |
| 2016/0189249 A1 | 6/2016 | Meyer et al. | |
| 2016/0191356 A1* | 6/2016 | Sundaresan | H04L 67/42 |
| | | | 709/224 |
| 2016/0212474 A1 | 7/2016 | Canipe et al. | |
| 2017/0026701 A1 | 1/2017 | Shaw et al. | |
| 2017/0083468 A1 | 3/2017 | Sengoku | |
| 2017/0236512 A1* | 8/2017 | Williams | G06F 16/68 |
| | | | 381/79 |

OTHER PUBLICATIONS

Office Action for U.S. Appl. No. 15/473,348, dated Jul. 9, 2018, Klein, "Accessory for a Voice-Controlled Device", 23 pages.

* cited by examiner

1700

```
RECEIVE 1ST AUDIO DATA GENERATED BY A 1ST DEVICE, THE 1ST
DEVICE IN AN ENVIRONMENT THAT INCLUDES A 2ND DEVICE, THE 1ST
AUDIO DATA REPRESENTING SPEECH OF A USER
1702
```

```
DETERMINE, BASED ON THE 1ST AUDIO DATA, TO INSTRUCT THE 1ST
DEVICE TO OUTPUT 1ST CONTENT IN THE ENVIRONMENT
1704
```

```
DETERMINE, BASED ON THE 1ST AUDIO DATA, TO INSTRUCT THE 2ND
DEVICE TO OUTPUT 2ND CONTENT IN THE ENVIRONMENT AT AN OFFSET
RELATIVE TO A POSITION IN THE 1ST CONTENT
1706
```

```
CAUSE THE 1ST DEVICE TO OUTPUT THE 1ST CONTENT
1708
```

```
CAUSE THE 2ND DEVICE TO OUTPUT THE 2ND CONTENT
1710
```

ACCESSORY FOR A VOICE-CONTROLLED DEVICE

BACKGROUND

Homes are becoming more connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion sensors, and image sensors. Another way to interact with computing devices is through natural language processing, such as that performed on speech input. Discussed herein are technological improvements for, among other things, these computing devices and systems involving the computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 17 illustrates a flow diagram of an example process for causing an accessory device to output supplemental content in an environment at an offset relative to a position within primary content output by a primary device.

DETAILED DESCRIPTION

Figure 1:
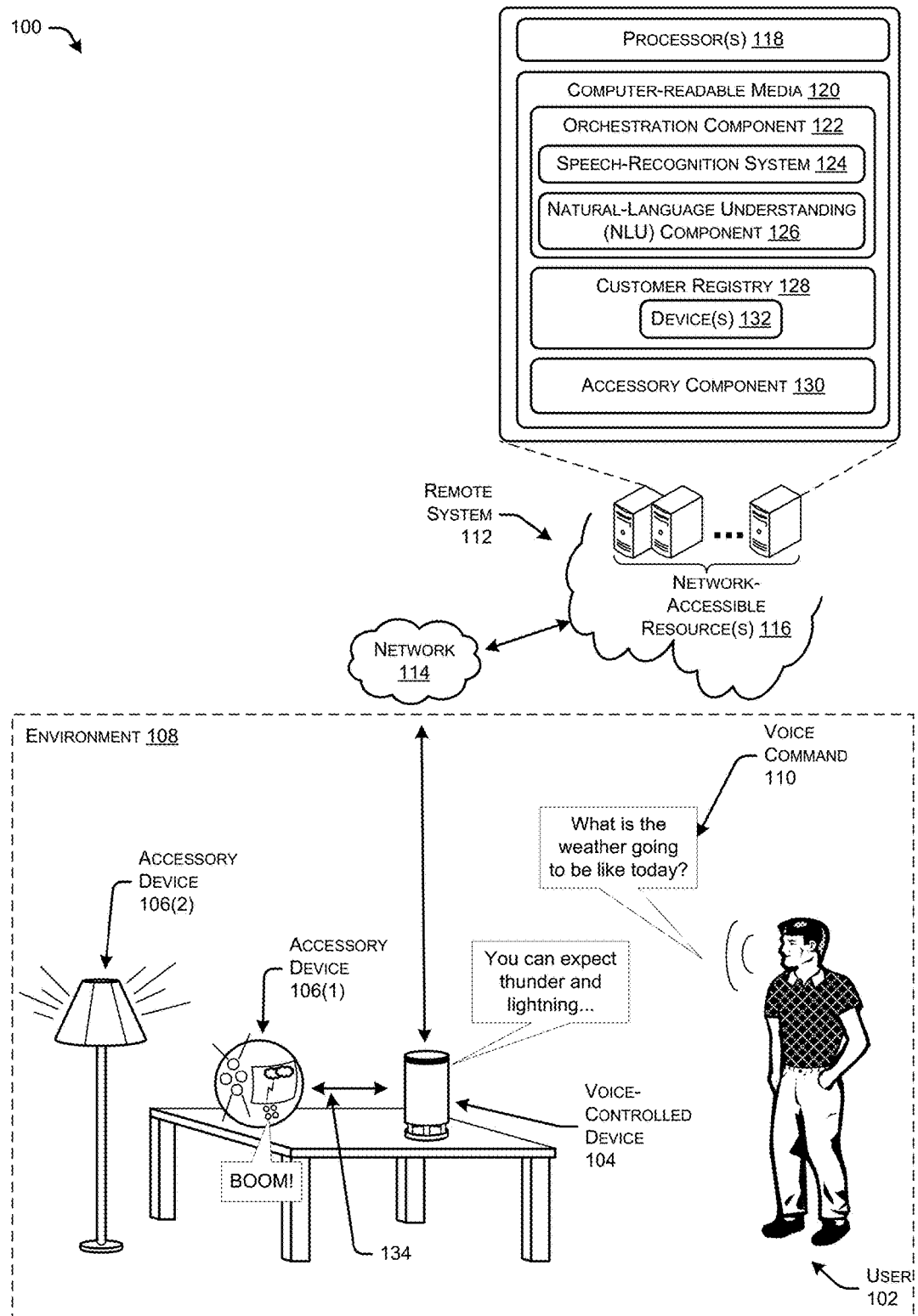
FIG. 1 is a conceptual diagram of an illustrative environment in which a device outputs primary content and one or more accessory devices output supplemental content that supplements the primary content.

This disclosure is directed to systems, devices, and techniques pertaining to coordinated operation of a device and one or more accessory devices in an environment. An environment may include at least one device and one or more accessory devices. The "device" is configured to receive voice commands from a user in the environment, and to cause performance of operations via the devices and/or the one or more accessory devices in the environment. In order to accomplish this, the device is coupled, via one or more computer network(s), to a remote system that comprises a speech recognition system used to process audio data received from the device, and to send information and instructions to the device and/or the one or more accessory devices in the environment. The information and instructions, upon receipt and subsequent processing at the device and the one or more accessory devices, cause coordinated operation of the device and the one or more accessory devices.

In some instances, the device is configured to output primary content in an environment, while one or more accessory devices output supplemental content in the environment. For example, the device may output first audio data, while the accessory devices may output second audio data in coordination with the first audio data. For instance, the accessory device(s) may output supplemental content at a particular offset relative to a position in the first audio data. In other instances, the device may output visual data in addition or alternative to audio data, and the accessory device(s) may output visual data, audio data, or any combination thereof. Further, the timing of the output of the supplemental content may or may not be coordinated with the timing of the output of the primary content.

In some instances, the primary content comprises content that corresponds to a request received from a user. For instance, if a user requests information about the day's weather forecast, the primary content may comprise audio and/or visual data indicate the weather forecast. In another example, if the user requests that a device output a certain song or video, the primary content may comprise the requested content. The supplemental content, meanwhile, may comprise content that is related to but ancillary to the initial request. For instance, if the user requests information regarding the weather forecast, the supplemental content may comprise audio and/or visual content depicting certain weather effects, such as a picture of a sun or clouds or the sound of thunder or rain. Of course, while a few examples have been provided, it is to be appreciated that the techniques may apply to any other type of primary and/or supplemental content. Further, the primary and supplemental content may be related in any number of ways. For instance, the primary content may include metadata specifying certain content that has been deemed supplemental to the primary content. Or, the techniques may utilize a database that maps certain pieces of primary content to certain pieces of supplemental content, or vice versa. Again, other techniques may be used to store associations between primary content and supplemental content.

In some instances, the device, the accessory device(s), and/or other device(s) in the environment may communicate with a remote system over a network (e.g., over a wireless local area network (WLAN) utilizing the IEEE 802.11 standards, over a wired network, or the like). For example, the remote system may provide the primary content and/or the supplement content for output in the environment. In some instances, a user interacts with the device, which in turn communicates with the remote system. The remote system then determines primary content to output on the device (or another device) based on the particular request of the user. In addition, the remote system may determine supplemental content to output by one or more accessory devices within the environment.

After identifying the primary and/or supplemental content, the remote system may determine how to send this content to the devices in the environment. In some instances, the remote system sends the primary content (or information for acquiring the primary content) and the supplemental content (or information for acquiring the supplemental content) to the device. The device may then output the primary content and may send the supplemental content (or the information for acquiring the supplemental content) to the accessory device(s). For example, the device may send the supplemental content or the information for acquiring the supplemental content to the accessory device(s) over a short-range wireless communication channel, such as a wireless personal area network (WPAN) utilizing the IEEE 802.15 protocol (e.g., WiFi direct, Bluetooth, Bluetooth Low-Energy, Zigbee, or the like). In another example, the remote system may send, over the network, the primary content (or the information for acquiring the primary content) to the device while sending the supplemental content (or the information for acquiring the supplemental content) to the accessory device(s) over the network.

In yet another example, the remote system may encode instructions for causing the accessory device(s) to output the supplemental content in data sent to the device. For example, the remote system may generate audio data that encodes or otherwise includes the instructions for causing the accessory device to identify and output the supplemental content. The remote system may then send this audio data to the device, which may in turn output this audio data. Microphone(s) of the accessory device(s) may then generate an audio signal based on the captured sound and may decode or otherwise determine the audio signal represents the instructions. Some types of accessory devices can store content locally along with a map of audio-data-to-content, such that upon analyzing the audio signal the at least one of the accessory devices identifies the locally stored supplemental content to output and outputs this content in the environment. In some instances, the audio data generated by the remote system that encodes the instructions may comprise high-frequency audio data having a frequency that is inaudible to the human ear. For instance, the high-frequency audio data may have a frequency range of between 3,000 hertz (Hz) and 30,000 Hz, above 20,000 Hz, etc. Regardless of the particular frequency range, in some instances the instructions may be encoded in the audio data using frequency-key shifting (FSK) techniques, where the frequency is modulated in a predefined manner, with this frequency modulation corresponding to specific content to output on the accessory device(s). These FSK techniques may include binary FSK, continuous-phase FSK, Gaussian FSK, minimum shift-keying, audio FSK, or the like. Of course, while the above example describes encoding the instructions using FSK techniques, the instructions to output the supplemental content may be encoded using other techniques. Further, while the above example describes encoding the instructions into audio data, the instructions may be encoded into visual data, such as via a flashing light that switches between on and off according to a predefined pattern, with the pattern corresponding to certain supplemental content.

As an illustrative example, a user in the environment can ask (by uttering a voice command) the device about the weather (e.g., "wakeword, what is the weather today?"). The device in the environment may capture, via one or more microphone(s), sound in the environment that corresponds to the uttered voice command, generate audio data based on the captured sound, and send the audio data (e.g., starting just before, during, or after "wakeword") to a remote system that performs speech recognition processing on the audio data.

Speech recognition processing can include automatic speech recognition (ASR) processing to generate text data corresponding to the audio data. ASR is a field of computer science, artificial intelligence, and linguistics concerned with transforming audio data associated with speech into text representative of that speech. The ASR text data can be processed through natural language understanding (NLU) processing. NLU is a field of computer science, artificial intelligence, and linguistics concerned with enabling computers to derive meaning from text input containing natural language. ASR and NLU can be used together as part of a speech processing system. Here, the ASR/NLU systems are used to identify, in some instances, one or more domains of the NLU system, and one or more intents associated with the multiple domains. For example, the speech recognition system, via the NLU processing, may identify a first intent associated with a first domain. Continuing with the above example, the first intent may comprise a "weather_inquiry" intent, and the first domain may comprise a "weather" domain based on the following ASR text data: "what is the weather." Associated slot data may also be provided by the natural language understanding processing, such as location data associated with the intent (e.g., <intent:weather_inquiry>; <location_98005>). That is, the speech recognition processing can determine that the user wants a device in the environment, such as the device, to output an indication of the weather forecast for a zip code associated with the environment, and accordingly, the speech recognition system identifies the weather domain, the weather-inquiry intent, and location slot data to fulfill this request.

The NLU system may also identify a named entity within the ASR text data, such as "today". The named entity identified from the ASR text data may be one of a plurality of named entities associated with the weather domain (e.g., today, tomorrow, Saturday, etc.). As such, the named entity can be another type of slot data used by the domain to determine primary content (e.g., text, image, and/or audio data) outputted in response to the voice command.

In response to identifying the user's request that the device output the expected weather for the day, the remote system may generate second audio data for sending back to the device. In some instances, the remote system determines the expected weather for the certain day and generates the second audio data to represent this expected weather. In other instances, the second audio data is separate from the indication of the actual weather. For instance, the remote system may generate second audio data configured to output "here is today's weather:" and then may instruct the device to obtain the primary content from another network resource. That is, the remote system may identify a network location (e.g., a uniform resource locator (URL) at which the device is able to acquire the day's weather. The remote system may then send the second audio data and the URL (or other network-location indication) to the device, which may obtain the primary content from the network location (using the URL), and output the second audio data and any additional audio data acquired from the network location. In either instance, whether the remote system generates the primary content (the weather forecast) or instead sends information for acquiring the primary content, the device, the device may output primary content such as "You can expect thunder and lightning today" or "Here is today's weather: it is expected to thunder and lightning today."

In addition to identifying the primary content to output on the device (or other device in the environment of the user) in response to receiving the user's voice command, the remote system may identify supplemental content to output by one or more accessory devices in the environment. For example, in response to receiving the request for the day's weather, the remote system may determine whether or not additional accessory devices reside in the environment of the device. To do so, the remote system may reference an identifier that accompanies (or is sent separately from) the request received from the device. This identifier may comprise a device identifier (e.g., MAC address, IP address, etc.), an account identifier (e.g., an account associated with the device, etc.), a customer identifier (e.g., an identifier of a particular user or user account), or the like. Using this identifier, the remote system may determine the account of the device at the remote system and may determine whether or not the account indicates that accessory devices reside within the environment of the device. If so, then the remote system may determine whether supplemental content is to be outputted along with the primary content (i.e., the weather).

In one example, an accessory service monitors interactions between the device (and other devices) and the remote system to identify events there between. The accessory service then determines which events to respond to, having been preconfigured to respond in certain ways to certain events. In this example, the accessory service may determine that the remote system is going to instruct (or has instructed) the device to output "You can expect thunder and lightning". The accessory service may determine that this forecast is associated with one or more pieces of supplemental content, such as audio content mimicking thunder, video content of lightning strikes, the flashing of lights, or the like. The accessory service may then identify which pieces of supplemental content to cause the accessory devices to output based on the accessory devices present in the environment. For example, the accessory service may cause a first accessory to output audio content of thunder and visual content of lightning flashing while determining to cause lights in the environment (example accessory devices) to flash off and on to mimic lightning.

After identifying the supplemental content to output in the environment, the accessory service may determine how to send instructions to the accessory device(s) in the environment. To make this determination, the accessory service may determine a device type of each accessory device and may determine capabilities of each accessory device based on the device type. If, for instance, a first accessory device is WiFi-enabled, then the accessory service may send the instructions to cause the first accessory device to output the supplemental content over a network. If, however, a second device only communicates locally with the device or another device within the environment, the accessory service may send these instructions to the device (or other device), which may in turn relay the instructions via a short-range wireless connection. In another example, the accessory service may encode the instructions in audio data and/or visual data, which may be sent to the device or another device in the environment for output.

In this example, the accessory service may send respective instructions to a first accessory device and a second accessory device (directly or via the device or another device) to cause the first accessory device to flash lightning on its display and output a thunder sound and to cause the second accessory device to flash its lights off and on. Furthermore, the output of the supplemental content may be coordinated with the output of the primary content. That is, the remote system may provide timing information to the device and/or the accessory devices such that the primary content and the information for acquiring/identifying supplemental content is output in a coordinated manner. Outputting the primary content and the information for acquiring/identifying the supplemental content in a coordinated manner may include outputting the audio data simultaneously, serially, in an interspersed manner, or in any other coordinated manner. For instance, sub-band coding techniques may be utilized to generate a single audio signal that includes the primary content corresponding to a first frequency range and the information for identifying/acquiring the supplemental content corresponding to a second audio range that is inaudible to a human user. Thus, the single audio signal may be output on the local device, resulting in simultaneous output of the primary content and the information for identifying/acquiring the supplemental content. In other instances, these audio signals partly or wholly serially.

In some instances, the remote system sends an indication of a time at which to output the primary content and/or the supplemental content. For instance, the remote system may determine a first time at which to beginning outputting the primary content and a second time (before, after, or the same as the first time) at which to begin outputting the supplemental content. The remote service may then send the respective times to the device and the accessory devices. In another example, the remote system encodes an indication of an amount of time after some specified event at which to output content. For instance, the accessory service may indicate that the accessory device is to begin outputting the sound of thunder one hundred milliseconds after identifying the word "thunder" in the primary content. Therefore, upon generating an audio signal and performing ASR on the signal to identify the word "thunder", the accessory device may begin its timer for 100 milliseconds and output the thunder sound upon expiration of the timer. Regardless of how the offset between the primary and supplemental content is specified, the primary and supplemental content may be output in a coordinated manner.

For purposes of discussion, examples are used herein primarily for illustrative purposes. For example, the techniques described herein are often described with reference to playback of audio content on devices. However, it is to be appreciated that the techniques and systems described herein may be implemented with any suitable content and using any suitable devices (e.g., computers, laptops, tablets, wearables, phones, etc.). Where displays are employed, content can also comprise visual content, such as a movie, music video, graphics, animations, and so on. Accordingly, "content" as used herein can comprise any suitable type of content, including multimedia content.

FIG. 1 is an illustration of an example system architecture 100 in which a user 102 utilizes a device 104 to control one or more accessory devices 106(1) and 106(2). FIG. 1 shows a first accessory device 106(1) in the form of a spherical toy and a second accessory device 106(2) in the form of a lamp. FIG. 1 is provided to aid in comprehension of the disclosed techniques and systems. As such, it should be understood that the discussion that follows is non-limiting. For instance, the accessory devices used herein may have any other form factors such as animatronic puppets, display devices, furniture, wearable computing devices, or the like. Further, the techniques may apply beyond the device 104. In other instances, the device 104 may be replaced with a mobile device, a television, a laptop computer, a desktop computer, or the like.

Within FIG. 1, the user 102 may interact with one or more accessory devices (collectively 106) within an environment 108 by uttering voice commands that are directed to the device 104 in the environment 108. For instance, if the user 102 would like to have the accessory 106 "dance" and "sing" to music that is output via the device 104 and/or via the accessory 106, the user 102 may issue a voice command to the device 104 to "Tell Accessory_Device to sing and dance to Artist_Name." Multiple other voice commands are possible, such as "Tell Accessory_Device to play a game," or, in the case of multiple accessory devices 106 in the environment 108, "tell my Accessories to dance together to Artist_Name," or the like. In each case, the device 104 may interact with a remote system, discussed below, to cause the accessory device 106 to perform the requested operation. For instance, the accessory device 106 may receive a stream of control information along with an instruction (or command) to begin processing the stream of control information at a time specified in the instruction. Processing of the control information by the accessory device 106 may cause the accessory device 106 to operate in a mode of operation among multiple available modes of operation, and/or cause operation of a component(s) of the accessory device 106, such as components including, without limitation, individual light sources of a plurality of light sources, a display, a movable member (e.g., a movable mouth or another appendage of an animatronic version of the accessory device 106, etc.), and the like.

In a non-illustrated example, for instance, the user 102 may desire to have an accessory device "sing" and "dance" to music by operating light sources of the device (e.g., light emitting diodes (LEDs)) and presenting lip synch animations on a display of the accessory device. Accordingly, the user 102 could speak a natural language command, such as "Tell Accessory_Device to sing and dance to Artist_Name." The sound waves corresponding to the natural language command 110 may be captured by one or more microphone (s) of the device 104. In some implementations, the device 104 may process the captured signal. In other implementations, some or all of the processing of the sound may be performed by additional computing devices (e.g. servers) connected to the device 104 over one or more networks. For instance, in some cases the device 104 is configured to identify a predefined "wake word" (i.e., a predefined utterance). Upon identifying the wake word, the device 104 may begin uploading an audio signal generated by the device to the remote servers for performing speech recognition thereon, as described in further detail below.

While the user 102 may operate accessory devices directly via voice commands to the device 104, such as in the example instructing the accessory to sing and dance to a particular song, in other instances the accessory devices may output supplemental content that supplements content output by the device 104 or another device in the environment. In some instances, the accessory device(s) (such as devices 106(1) and 106(2)) may output supplemental content without receiving explicit instructions from the user 102 to do so.

To provide an example, FIG. 1 illustrates that the user 102 may provide a voice command 110 asking the device 104, "what is the weather going to be like today?" In response to generating audio data based on sound captured by one or more microphones of the device 104, the device 104 may upload the audio data to a remote system 112 over a network 114.

The network 114 may represent an array or wired networks, wireless networks (e.g., WiFi), or combinations thereof. The remote system 112 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the remote system 112, include "on-demand computing", "software as a service (SaaS)", "platform computing", "network accessible platform", and so forth.

As illustrated, the remote system 112 may comprise one or more network-accessible resources 116, such as servers. Multiple such resources 116 may be included in the system 112 for training ASR models, one server(s) for performing ASR, one resource/device 116 for performing NLU, etc. These resources 116 comprise one or more processors 118, which may include a central processing unit (CPU) for processing data and computer-readable instructions, and computer-readable storage media 120 storing the computer-readable instructions that are executable on the processors 118. The computer-readable media 120 may individually include volatile random access memory (RAM), non-volatile read only memory (ROM), non-volatile magnetoresistive (MRAM) and/or other types of memory, and may store an orchestration component 122 that includes a speech-recognition system 124 and a natural-language-understanding (NLU) component 126. The computer-readable media 120 may also store a customer registry 128 and an accessory component 130. The customer registry 128 may store a datastore indicating devices 132 that reside in the environment 108 (and potentially other user environments). It is noted that the computer-readable media 120 may individually include one or more non-volatile storage types such as magnetic storage, optical storage, solid-state storage, etc. The resources 116 may also be connected to removable or external non-volatile memory and/or storage (such as a removable memory card, memory key drive, networked storage, etc.) through respective input/output device interfaces.

Computer instructions for operating the resource 116 and its various components may be executed by the processor(s) 118, using the computer-readable media 120 as temporary "working" storage at runtime. A resource's 116 computer instructions may be stored in a non-transitory manner in non-volatile memory, storage, or an external device(s), and computer-readable media 120 can represent some or all of these memory resources. Alternatively, some or all of the executable instructions may be embedded in hardware or firmware on the respective device in addition to or instead of software.

Each resource 116 can include input/output device interfaces. A variety of components may be connected through the input/output device interfaces. Additionally, the resource(s) 116 may include an address/data bus for conveying data among components of the respective device. Each component within resource 116 may also be directly connected to other components in addition to (or instead of) being connected to other components across the bus.

Upon the device 104 identifying the user 102 speaking the predefined wake word (in some instances), the device 104 may begin uploading audio data—the audio data representing sound captured by a microphone(s) of the device 104 within the environment 108—up to the remote system 112 over the network 114. In response to receiving this audio data, the speech-recognition system 124 (part of a speech recognition system) may begin performing ASR on the audio data to generate text data. The NLU component 126 may then use NLU to identify one or more user voice commands from the generated text data.

Accordingly, upon receiving the audio data from the device 104, the speech-recognition system 124 may perform ASR on the audio data to generate text data. The text data may then be processed by the NLU component 126 to identify a domain(s) and an intent(s). In some instances, the text data generated from the audio data will indicate multiple intents and multiple corresponding domains. In the illustrated example, the speech-recognition system 124 performs ASR on the audio signal received from the device 104 to generate the text: "what is the weather going to be like today?" The NLU component 126 then determines, from analyzing this text, that the voice command 110 corresponds to a "weather" domain and that the intent of the command 110 is about determining the weather for the current day, which may comprise a named entity in the command 110.

As such, other components of the speech platform associated with the weather domain and described in further detail below may determine primary content that is to be output by the device 104 in response to the voice command 110. For instance, the remote system 112 may determine the expected weather for the day and may either generate content to output on the device 104 (or another device in the environment 108) or may provide a network location at which to allow the device or other device to acquire the content. In this example, the remote system generates audio data corresponding to the day's expected weather and provides this audio data to the device 104 for output on one or more speakers of the device 104. As illustrated, the device 104 outputs an indication, such as: "you can expect thunder and lightning . . . ."

In addition, the accessory component 130 may determine whether or not the interaction between the user 102 and the remote system 112 is one in which one or more accessory devices in the environment 108 should output supplemental content that supplements the primary content (i.e., the weather prediction). First, the accessory component 130 may determine whether the environment 108 includes or is likely to include any accessory devices 106. To do so, the accessory component 130 may analyze an identifier received from the device 104 to determine whether the account associated with the device 104 has been associated with any accessory devices. For example, the device 104 may upload, with or near-in-time to the audio data representing the voice command 110, a device identifier (e.g., a MAC address, IP address, serial number, etc.), a username, an account identifier, or the like, which the accessory component 130 may use to identify an account associated with the user 102 and/or the device 104. Using this information, the accessory component 130 may identify a set of one or more accessory devices 132 that have been registered to the user 102 and/or have been registered as residing with the environment 108 within the customer registry 128. In this example, the accessory component 130 may determine that the environment includes the accessory devices 106(1) and 106(2).

In addition to determining that the environment includes one or more accessory devices 106, the accessory component 130 may determine whether supplemental content should be output based on the interaction between the user 102 and the remote system 112. To do so, the accessory component 130 may analyze the text generated by the speech-recognition system 124, the domain/intent determination made by the NLU component 126, the audio data to be output by the device 104, and/or any other information associated with the interaction to determine whether supplemental content should be output on one or more of the accessory devices in the environment 108.

In this example, the accessory component 130 determines that supplemental content is to be output on both the accessory devices 106(1) and 106(2) in coordination with output of the primary content to be output on the device 104. First, the accessory component 130 may determine, based on a mapping between the primary content and supplemental content, that an accessory device with a display should output a picture or animation or a lightning bolt based on the weather predicting "lightning." In addition, the accessory component 130 determines that an accessory device capable of outputting audio should output a thunder sound based on the primary content including the term "thunder". In yet another example, the accessory component 130 determines that an accessory device that is capable of flashing lights should do so based on the primary content including the terms "thunder" and/or "lightning".

In still other instances, the accessory component 130 may be configured to determine that the example supplemental content is to be output in coordination with output of the primary content on the device 104—that is, at a particular offset relative to a position within the primary content. In this example, the accessory component determines that the picture of the lightning is to be output when the device 104 states the word "lightning" while the flashing lights and thunder sounds are to be output at a time corresponding to output of the word "thunder".

Therefore, the remote system 112 may send both the primary content (or information for acquiring/identifying the primary content) and the supplemental content (or information for acquiring/identifying the supplemental content) to devices in the environment 108. In instances where both an accessory device and the device 104 (or other primary device) is configured to communicate with the remote system 112 over the network 114, the remote system may send the respective data to each respective device. That is, the remote system 112 may send the primary content (or the information for acquiring/identifying the primary content) to the device 104, a portion of the supplemental content (or information for acquiring/identifying the portion supplemental content) to the accessory device 106(1) over the network 114 and another portion of the supplemental content (or information for acquiring/identifying the additional supplemental content) to the accessory device 106(2) over the network.

In other instances, the remote system 112 may send the primary content (or information) and the supplemental content (or information) to the device 104, which may in turn send respective portions of the supplemental content (or information) to the respective accessory devices 106(1) and 106(2) over a local communication channel 134. The local communication channel 134 may include short-range wireless communication channels, such as WiFi direct, Bluetooth, Bluetooth Low-Energy (BLE), Zigbee, or the like.

In yet another instance, the remote system 112 may encode the supplemental content (or information) into additional data and may provide this additional data for output by the device 104. For instance, the accessory component 130 may generate high-frequency audio data that utilizes FSK techniques for encoding a message into the audio data. The device 104 may then receive and output the high-frequency audio data. In some instances, while the audio data is in a frequency range that is inaudible to the user 102, microphone(s) of the accessory devices 106(1) and/or 106(2) may generate audio signals based on the high-frequency audio data and may decode instructions for outputting and/or acquiring supplemental data. In some instances, the high-frequency audio data instructs an accessory device to execute a local routing stored on the accessory device. That is, the encoded data may instruct the accessory device to output certain supplemental content that is stored on the accessory device. In other instances, the encoded data may specify a network location (e.g., a URL) at which the accessory device is to acquire the supplemental data.

While the above examples describe different manners in which the remote system 112 may communicate with the devices of the environment 108, it is to be appreciated that the system 112 and the local devices may communicate in other ways or in combinations of ways.

Regardless of the manner in which the instructions to output supplemental content reach the accessory devices, in some instances the instructions specify timing information for outputting the supplemental content. For example, the instructions may indicate a particular offset from a position of the primary content at which to output the supplemental content. In some instances, the instructions specify a time (e.g., based on a universal time clock (UTC)) at which to begin outputting the content. In another example, the instructions may instruct an accessory device to begin a timer at a particular UTC time and, at expiration of the timer, begin outputting the supplemental content. In another example, the instructions may instruct the accessory device to begin outputting the supplemental content after identifying a particular portion of the primary content being output by the device 104 or other primary device (e.g., the word "thunder"). Or, the instructions may instruct the accessory device to set a time for a particular amount of time after identifying the predefined portion of the primary content and to output the supplemental content at expiration of the timer. Of course, while a few examples have been provided, it is to be appreciated that the instructions may cause the accessory device(s) to output the supplemental content at the particular offset relative to the primary content in additional ways.

In the illustrated example, in response to the user stating the voice command 110, the remote system 112 causes the device 104 to output audio data stating "You can expect thunder and lightning . . . ." Further, the remote system 112 causes the accessory device 106(1) to output thunder sound on its speaker(s) and lightning on its display(s). The remote system 112 also causes the accessory device 106(2) to flicker its lights off and on. In some of these instances, the remote system 112 may cause these accessory devices to perform these actions (i.e., output this supplemental content) at particular offset(s) relative to a position(s) of the primary content. For instance, upon the device 104 stating the word "thunder", the accessory device 106(1) may output the thunder sound. Upon the device 104 outputting the term "lightning", the accessory device 106(1) may display the lightning bolt on the display while the accessory device 106(2) may flicker its lights.

Figure 2:
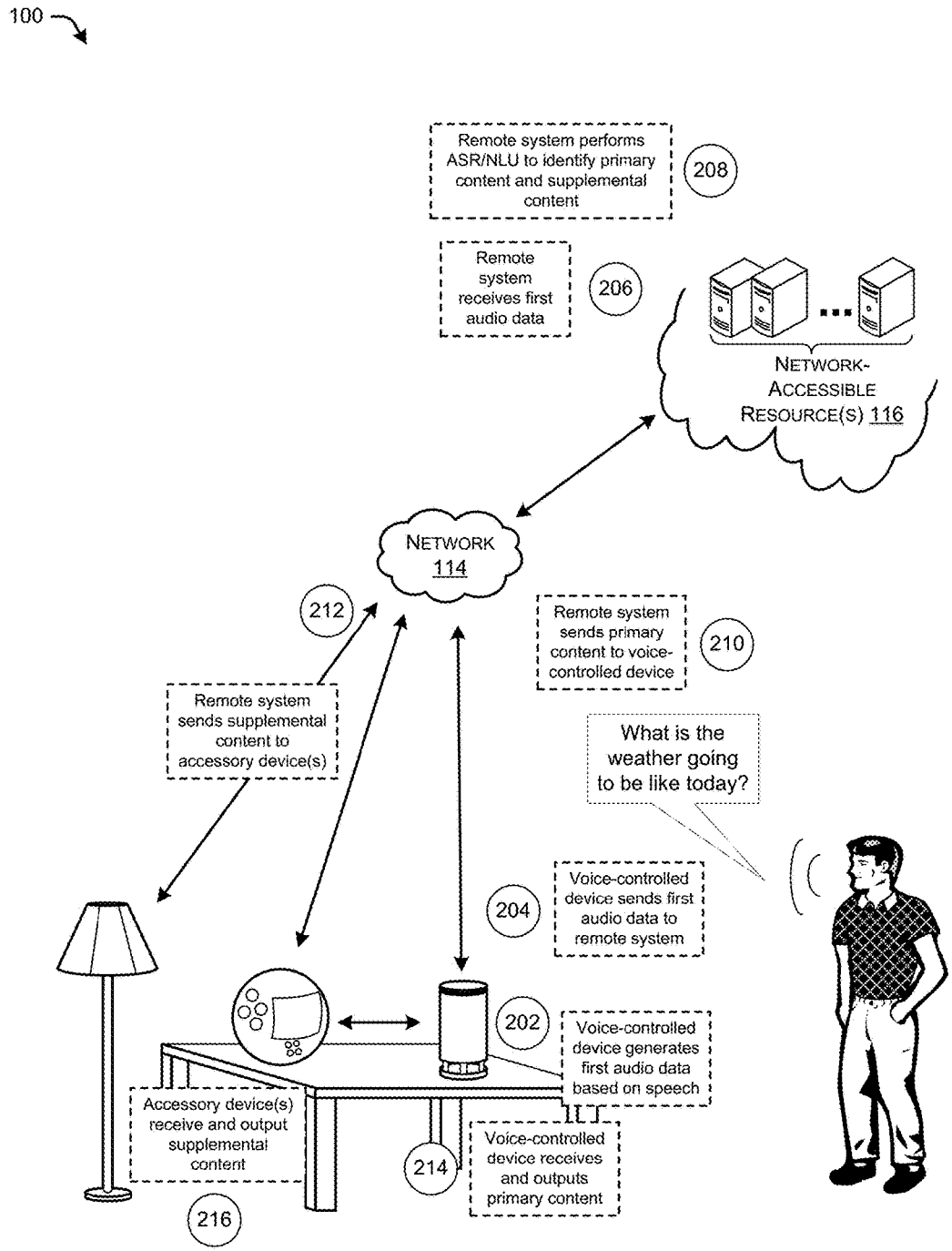
FIG. 2 illustrates an example in the environment of FIG. 1 where a remote system causes the accessory devices to output the supplemental content by sending the supplemental content directly to the accessory devices.

FIG. 2 illustrates an example in the environment of FIG. 1 where a remote system causes the accessory devices to output the supplemental content by sending the supplemental content directly to the accessory devices. As illustrated, in this example the user 102 states the example voice command "what is the weather going to be like today?" At "202", the device 104 generates first audio data based on the speech, as captured by one or more microphones of the device 104. At "204", the device 104 sends the first audio data to the remote system 112 over the network 114. At "206", the remote system receives the first audio data and, at "208", performs ASR and NLU on the audio data and the text corresponding to the audio data, respectively, to identify primary content and supplemental content to output in the environment of the user 102. It is to be appreciated in this example, that the remote system 112 also determines that the environment of the user 102 includes the accessory devices 106(1) and 106(2).

In this example, the remote system 112 determines that the accessory devices 106(1) and 106(2) in the environment are addressable over the network 114. Thus, at "210" the remote system sends the primary content (or a URL or the like for acquiring the primary content) to the device 104. At "212", meanwhile, the remote system sends respective portions of the supplemental content (or information acquiring/identifying the supplemental content) directly to the accessory devices 106(1) and 106(2). At "214", the device 104 receives and outputs the primary content. This may include acquiring the primary content in instances where the remote system 112 provides a URL, while it may include outputting received audio data in instances where the remote system 112 simply sends audio data as primary content for output by the device 104. At "216", the accessory devices receive and output the respective portions of the supplemental content. Again, this may include outputting data received from the remote system 112, acquiring the supplemental content and then outputting it, mapping the instructions to locally stored data and then outputting the locally stored data, or the like.

Figure 3:
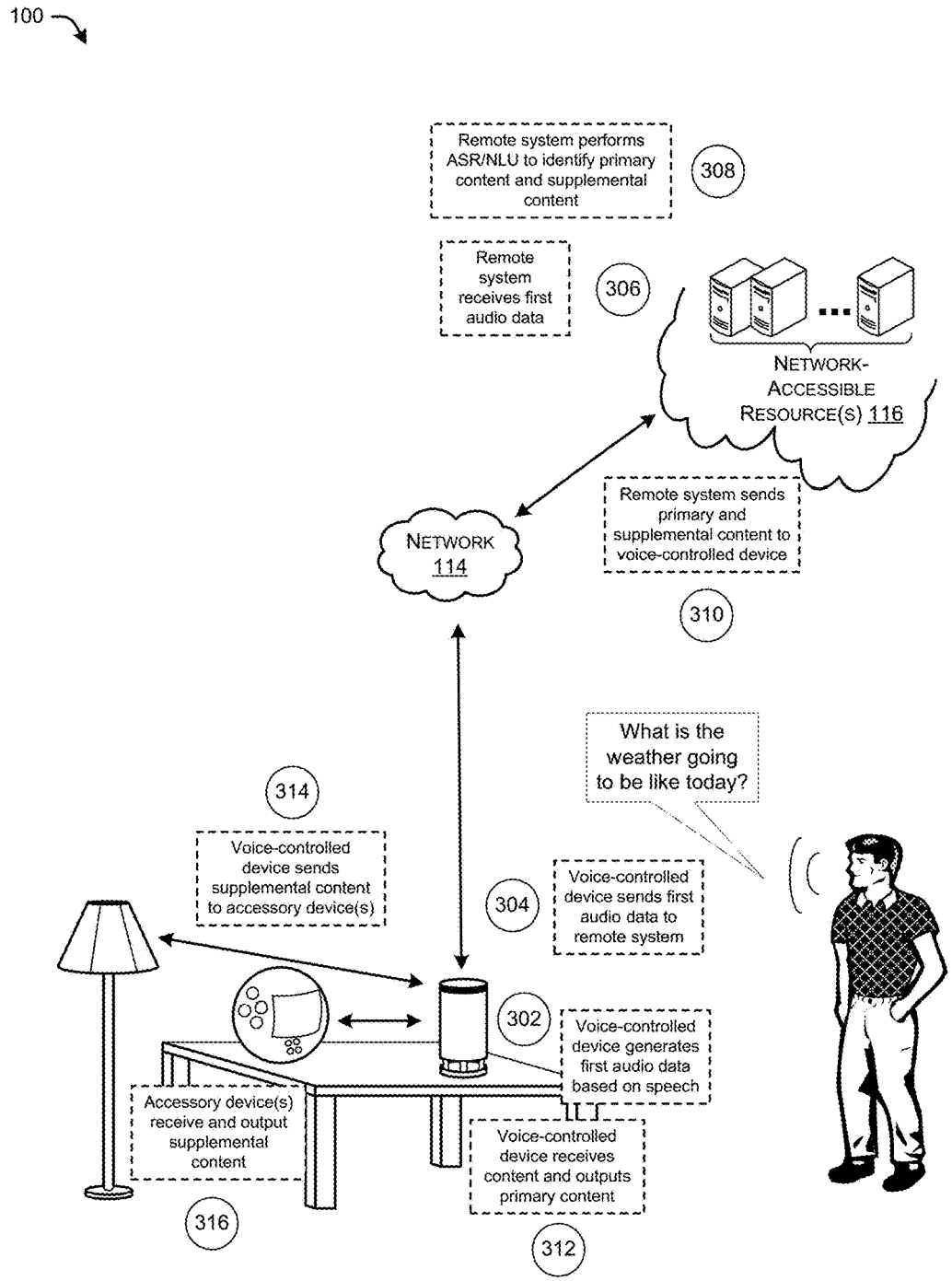
FIG. 3 illustrates an example in the environment of FIG. 1 where the remote system causes the accessory devices to output the supplemental content by sending the supplemental content to the device, which then sends the supplemental content to the accessory devices.

FIG. 3 illustrates an example in the environment of FIG. 1 where the remote system causes the accessory devices to output the supplemental content by sending the supplemental content to the device, which then sends the supplemental content to the accessory devices. As illustrated, in this example the user 102 again states the example voice command "what is the weather going to be like today?" At "302", the device 104 generates first audio data based on the speech, as captured by one or more microphones of the device 104. At "304", the device 104 sends the first audio data to the remote system 112 over the network 114. At "306", the remote system receives the first audio data and, at "308", performs ASR and NLU on the audio data and the text corresponding to the audio data, respectively, to identify primary content and supplemental content to output in the environment of the user 102. It is to be appreciated in this example, that the remote system 112 also determines that the environment of the user 102 includes the accessory devices 106(1) and 106(2).

In this example, however, the remote system 112 determines that the accessory devices 106(1) and 106(2) in the environment are not addressable over the network 114. Thus, at "310" the remote system sends the primary content (or a URL or the like for acquiring the primary content) along with the supplemental content (or information for acquiring/identifying the supplemental content) to the device 104. At "312", the device 104 receives and outputs the primary content. This may include acquiring the primary content in instances where the remote system 112 provides a URL, while it may include outputting received audio data in instances where the remote system 112 simply sends audio data as primary content for output by the device 104. At "314", the device sends the supplemental content (or information) to the accessory devices over a local connection. At "316", the accessory devices receive and output the respective portions of the supplemental content. Again, this may include outputting data received from the remote system 112, acquiring the supplemental content and then outputting it, mapping the instructions to locally stored data and then outputting the locally stored data, or the like.

Figure 4:
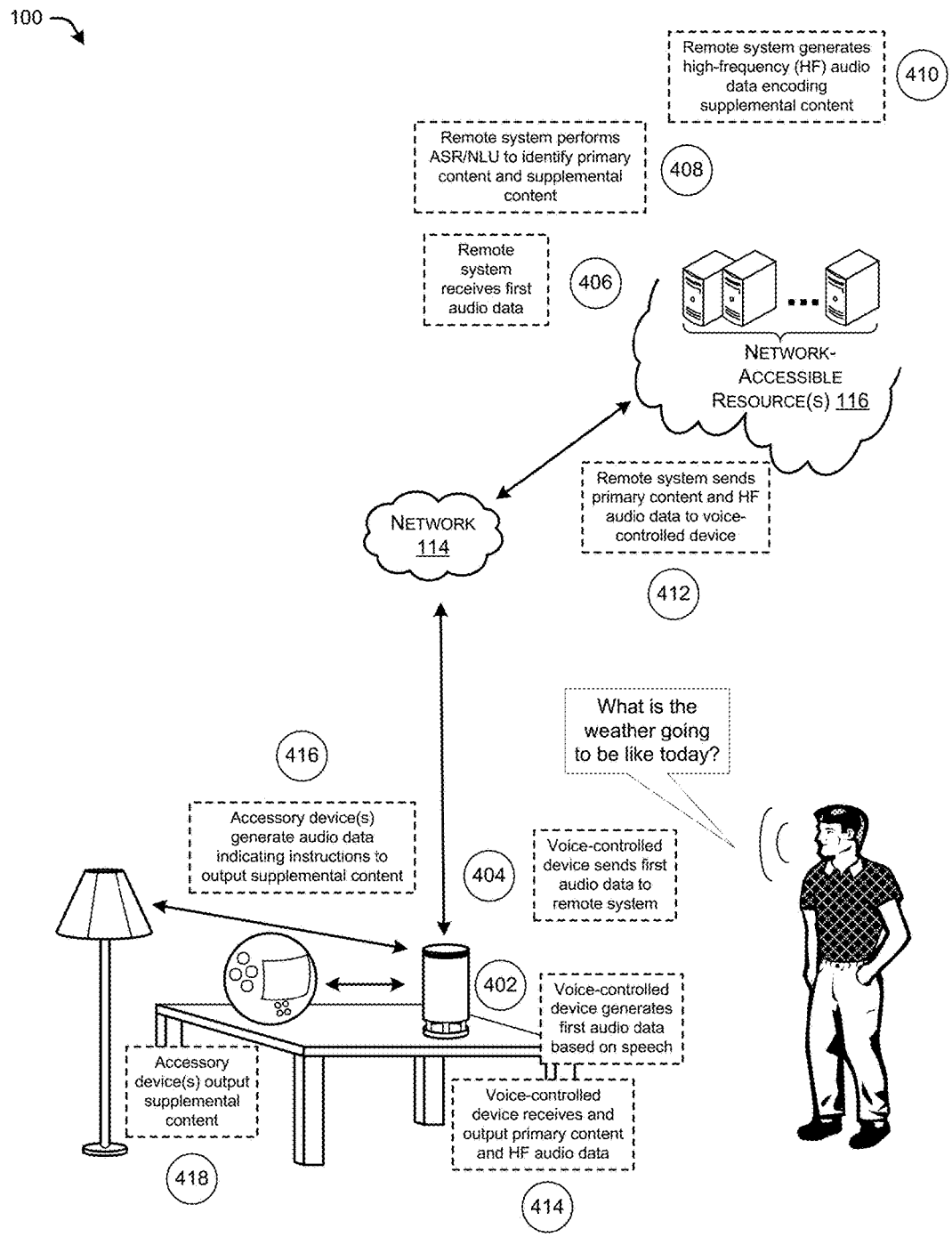
FIG. 4 illustrates an example in the environment of FIG. 1 where the remote system causes the accessory devices to output the supplemental content by sending high-frequency audio data to the device. Although this audio data may be inaudible to the user in the environment, it may encode instructions that cause the accessory devices to output the supplemental content in the environment.

FIG. 4 illustrates an example in the environment of FIG. 1 where the remote system causes the accessory devices to output the supplemental content by sending high-frequency audio data to the device. Although this audio data may be inaudible to the user in the environment, it may encode instructions that cause the accessory devices to output the supplemental content in the environment. As illustrated, in this example the user 102 again states the example voice command "what is the weather going to be like today?" At "402", the device 104 generates first audio data based on the speech, as captured by one or more microphones of the device 104. At "404", the device 104 sends the first audio data to the remote system 112 over the network 114. At "406", the remote system receives the first audio data and, at "408", performs ASR and NLU on the audio data and the text corresponding to the audio data, respectively, to identify primary content and supplemental content to output in the environment of the user 102. It is to be appreciated in this example, that the remote system 112 also determines that the environment of the user 102 includes the accessory devices 106(1) and 106(2).

In this example, the remote system 112 determines that the accessory devices 106(1) and 106(2) in the environment are not addressable over the network 114. Thus, at "410", the remote system generates high-frequency audio data encoding the supplemental content (or information for acquiring/identifying the supplemental content). At "412", the remote system sends the primary content (or a URL or the like for acquiring the primary content) and the high-frequency audio data to the device 104. At "414", the device 104 receives and outputs the primary content and also receives and outputs the high-frequency audio data. In some instances, the voice controlled device may output the primary content and the high-frequency audio data at a same time, while in other instances the device 104 may output them serially, partially overlapping, or the like. In some instances, the remote system 112 may in fact generate a signal audio file that includes both the primary content and the high-frequency data, such that the device 104 outputs both at a same time. At "416", the accessory devices generate audio data based on sound captured by their respective microphones and analyze the audio data to identify the instructions to output the supplemental content. At "418", the accessory devices output the supplemental content, which may include retrieving the content from a remote source, retrieving the appropriate content from local memory, or the like.

Figure 5:
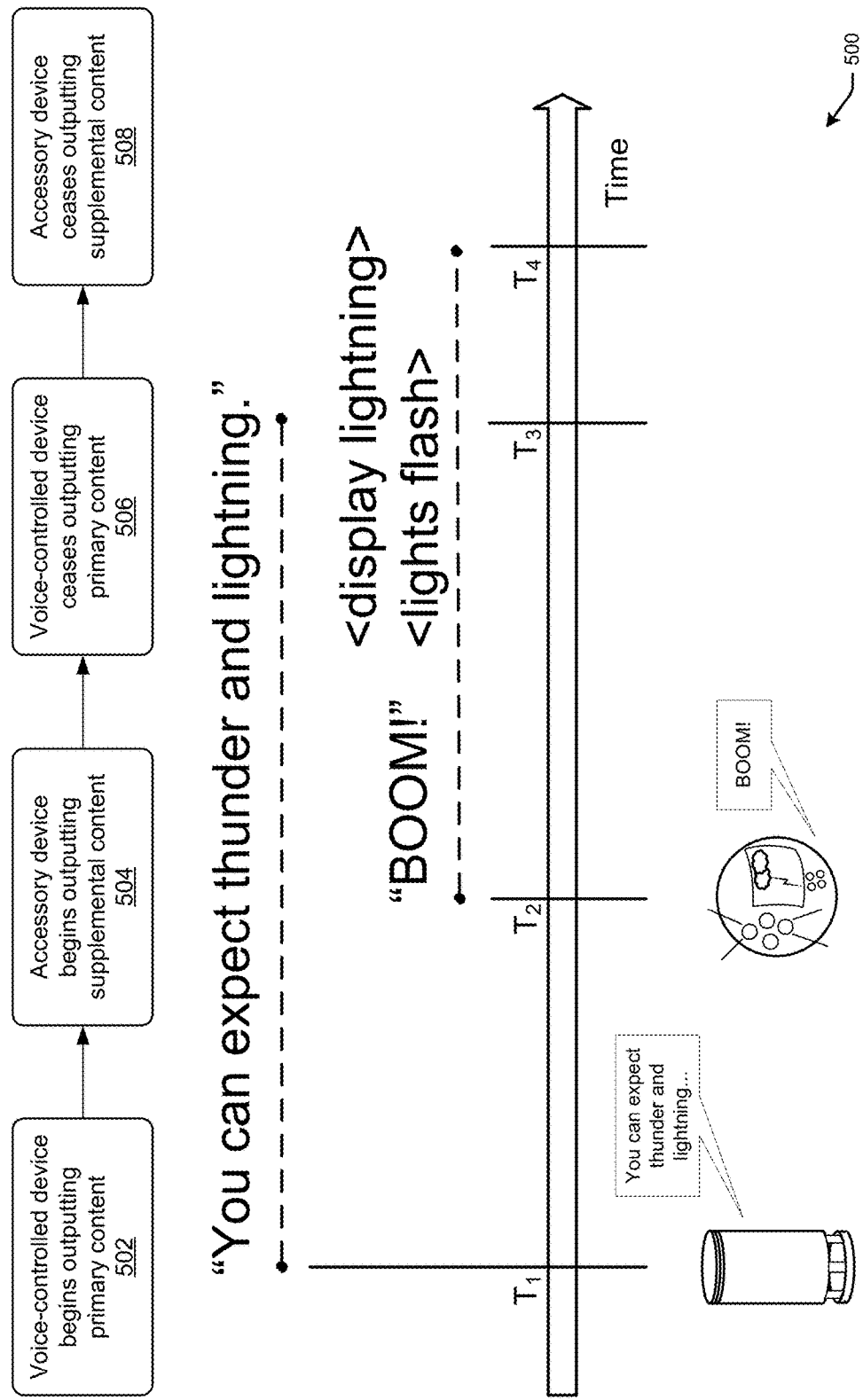
FIG. 5 illustrates how an accessory device may output the supplemental content may at a specified offset relative to a position of the primary content output by the device.

FIG. 5 illustrates an example process 500 how an accessory device may output the supplemental content at a specified offset relative to a position of the primary content output by the device. At 502 and at a time $T_1$, a device may begin outputting primary content 502, which may comprise audio data, visual data (e.g., images, animations, video, etc.), and/or the like. Continuing the example from above, the device 104 outputs the audio data "You can expect thunder and lightning . . . ." At 504 and at a time $T_2$, meanwhile, an example accessory device 106(1) begins outputting supplemental content. That is, the accessory device may output the supplemental content at a specified offset relative to a position within the primary content. In some instances where the accessory device (or multiple accessory devices) output different portions of supplemental content, the different portions may be output at different offsets. At 506 and at a time $T_3$, meanwhile, the device finishes and thus ceases outputting the primary content. At 508 and at a time $T_4$, the accessory device ceases outputting the supplemental content. For instance, the lights may cease flashing, the thunder sounds may stop, and/or the like. FIG. 5, therefore, illustrates that both that the supplemental content may be output at one or more specified offsets relative to one or more positions of the primary content, but also that the outputting of the primary and supplemental content may, but need not, overlap in whole or in part.

Figure 6:
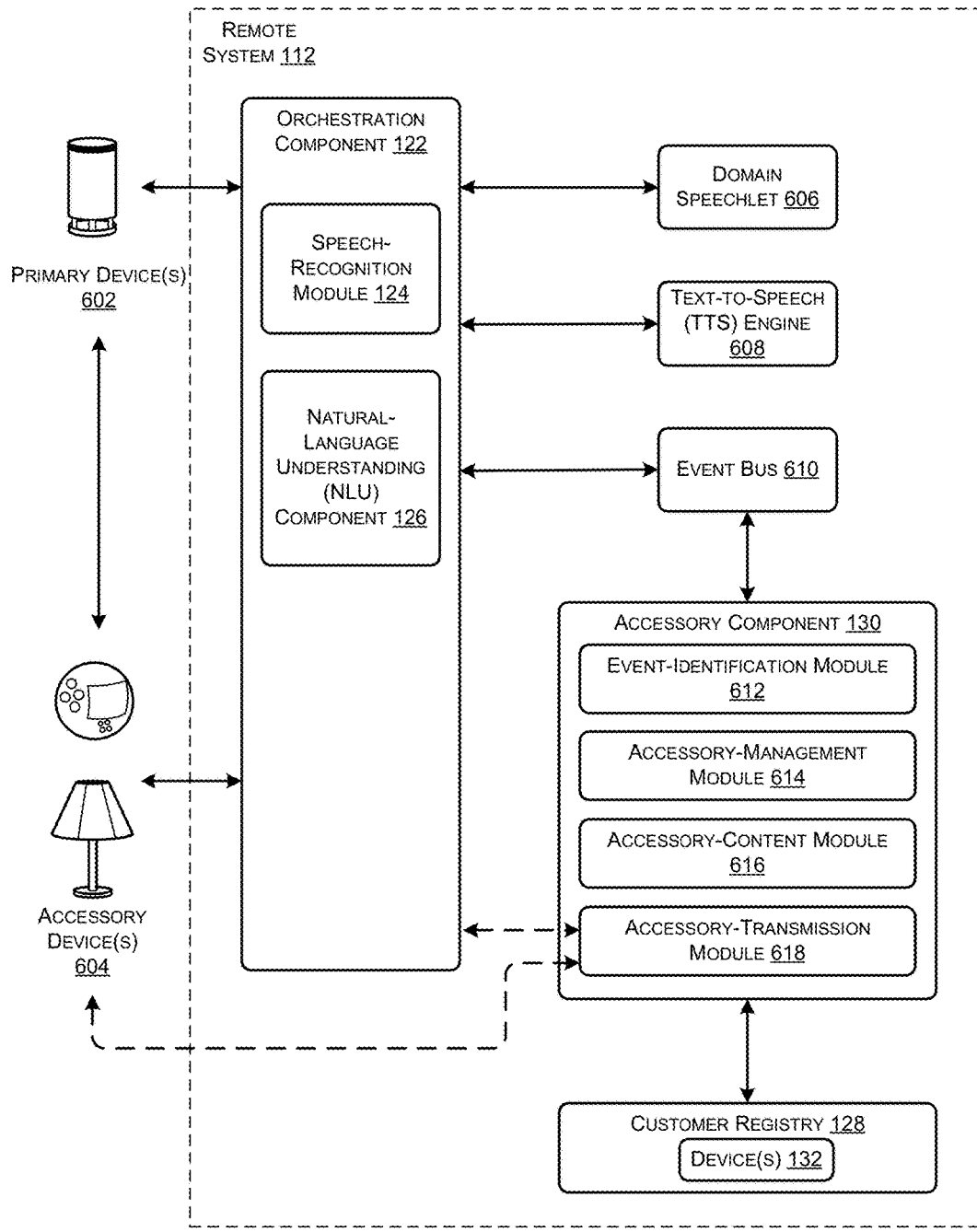
FIG. 6 is a conceptual diagram of components of the remote system for determining when to cause an accessory device to output supplemental content, identifying the supplemental output, and determining how to make the supplemental content available to the accessory device.

FIG. 6 is a conceptual diagram of components of the remote system 112 for determining when to cause an accessory device to output supplemental, identifying the supplemental output, and determining how to make the supplemental content available to the accessory device. As illustrated, FIG. 6 includes one or more primary devices 602, which may include devices, laptop computers, mobile phones, smart appliances, or any other type of electronic device. In addition, FIG. 6 includes one or more accessory devices 604. Again, the accessory devices may include any type of electronic device able to output audio content (e.g., music, tones, dialogue, etc.), visual content (e.g., images, videos, animations, lights, etc.), and/or the like. As shown, both the primary device(s) and the accessory device(s) may communicate, in whole or in part, with the orchestration component 122 of the remote system 112.

The orchestration component 122 may include or otherwise couple to the speech-recognition system 124 and the NLU component 126. When the primary device 602 comprises a device, the device may upload audio data to the orchestration component 122, for generating text of the audio data by the speech-recognition system 124. The NLU component 126 may then determine a domain and an intent by analyzing the text and, based on this determination, route the request corresponding to the audio data to the appropriate domain speechlet, such as the illustrated domain speechlet 606. While FIG. 6 illustrates the speech-based components, the orchestration component 122 may also route, to the appropriate domain speechlet, non-audio requests received from other types of primary devices.

In this example, the domain speechlet 606 receives the text associated with the audio data provided by the primary device 602 and determines how to respond to the request. In some instances, the domain speechlet 606 determines primary content to provide back to the requesting device or to another device, or determines a location at which the primary content is to be accessed (e.g., a URL). In addition, the domain speechlet may determine additional information to output on the requesting device or on another device, such as second audio data. For example, if the primary device sends a request for a particular song (e.g., "Play my oldies radio station"), the domain speechlet 606 may determine a URL to send back to the primary device 602 (for obtaining audio corresponding to the primary content, the requested radio station) as well as determine text for generating second audio data for output on the primary device, such as "Here is your requested station".

After the domain speechlet 606 determines a response to the received request, it provides this information back to the orchestration component 122, which in turns provides this information to a text-to-speech (TTS) engine 608. The TTS engine 608 then generates an actual audio file for outputting the second audio data determined by the domain speechlet 606 (e.g., "Here is your radio station", or "You can expect thunder and lightning . . . "). After generating the file (or "audio data"), the TTS engine 608 then provides this data back to the orchestration component 122.

The orchestration component 122 may then publish (i.e., write) some or all of this information to an event bus 610. That is, the orchestration component 122 may provide information regarding the initial request (e.g., the speech, the text, the domain/intent, etc.), the response to be provided to the primary device 602 (e.g., the URL for the primary content, the primary content, the second audio data for output on the device, etc.), or any other information pertinent to the interaction between the primary device and the remote system 112 to the event bus 610.

With the remote system 112, one or more components or services may subscribe to the event bus 610 so as to receive information regarding interactions between user devices and the remote system 112. In the illustrated example, for instance, the accessory component 130 may subscribe to the event bus 610 and, thus, may monitor information regarding these interactions. As illustrated, the accessory component 130 includes an event-identification module 612, an accessory-management module 614, an accessory-content module 616, and an accessory-transmission module 618.

The event-identification module 612 functions to monitor information published to the event bus and identify events that may trigger action by the accessory component 130. For instance, the module 612 may identify (e.g., via filtering) those events that: (i) come from devices that are associated with accessory device(s) (e.g., have accessory devices in their environments, and (ii) are associated with supplemental content. The accessory-management module 614 may reference the customer registry 128 to determine which primary devices are associated with accessory devices, as well as determine accessory device types, states, and other capabilities of these accessory devices. For instance, the module 614 may determine, from the information published to the event bus 610, an identifier associated with the primary device making the corresponding request. The module 614 may use this identifier to identify, from the customer registry 128, a user account associated with the primary device. The module 614 may also determine whether any accessory devices have been registered with the identified user account, as well as capabilities of any such accessory devices, such as how the accessory devices are configured to communicate (e.g., via WiFi, short-range wireless connections, etc.), the type of content the devices are able to output (e.g., audio, video, still images, flashing lights, etc.), and the like.

The accessory-content module 616 may determine whether a particular event identified by the event-identification module 612 is associated with supplemental content. That is, the accessory-content module 612 may write, to a datastore, indications of which types of events and/or which primary content is associated with supplemental content. In some instances, the remote system 112 may provide access to third-party developers to allow the developers to register supplemental content for output on accessory devices for particular events and/or primary content. For example, if a primary device is to output that the weather will include thunder and lightning, the module 616 may store an indication of supplemental content such as thunder sounds, pictures/animations of lightning and the like. In another example, if a device is outputting information about a particular fact (e.g., "a blue whale is the largest mammal on earth . . . "), then an accessory device, such as an animatronic puppet, may be configured to interrupt the device to add supplemental commentary (e.g., "they're huge!"). In these and other examples, the accessory-content module 616 may store an association between the primary content (e.g., outputting of information regarding the world's largest mammal) and corresponding supplemental content (e.g., the audio data, image data, or the like). In some instances, the accessory-content module 616 can also indicate which types of accessory devices are to output which supplemental content. For instance, in the instant example, the accessory-content module 616 may store an indication that accessory devices of a class type "animatronic puppet" is to output supplemental content corresponding to the audio commentary, while an accessory devices of a class type "tablet" is to output a picture of a blue whale. In these and other instances, meanwhile, the accessory-content module 616 may store the supplemental content in association with accessory-device capabilities (e.g., devices with speakers output the audio commentary, devices with screens output the image, etc.).

Finally, the accessory-transmission module 618 determines how to transmit primary and/or supplement content (and/or information acquiring the content) to the primary devices 602 and/or the accessory devices 604. That is, after the accessory component 130 has determined to send supplemental content (or information for acquiring/identifying supplemental content) to one or more accessory devices, the accessory-transmission module 618 may determine how to send this supplemental content to the accessory device(s). To make this determination, the module 618 may determine a device type of the accessory device(s), capabilities of the accessory device(s), or the like, potentially as stored in the customer registry 128. In some instances, the accessory-transmission module 618 may determine that a particular accessory device is able to communicate directly with the remote system 112 (e.g., over WiFi) and, thus, the accessory transmission module may provide the supplemental content (or information for acquiring the supplemental information) directly over a network to the accessory device (potentially via the orchestration component 122). In another example, the accessory-transmission component 618 may determine that a particular accessory device is unable to communicate directly with the remote system, but instead is configured to communicate with a primary device in its environment over short-range wireless networks. As such, the module 618 may provide the supplement content (or information) to the orchestration component 122, which in turn may send this to the primary device, which may send the information over a short-range network to the accessory device.

In still another example, the accessory-transmission module 618 may determine that a particular accessory device is configured to decode instructions to output supplemental content that is encoded in audio data, visual data, or the like. In these instances, the accessory-transmission module 618 may generate data that encodes instructions to obtain and/or output the supplemental content, such as high-frequency audio data that utilizes FSK techniques to encode the information. The accessory-transmission module may then send the high-frequency audio to the orchestration component 122, which in turns sends the audio data for output by the primary device. The accessory device then generates an audio signal and decodes the instructions to output the supplemental content.

Figure 7:
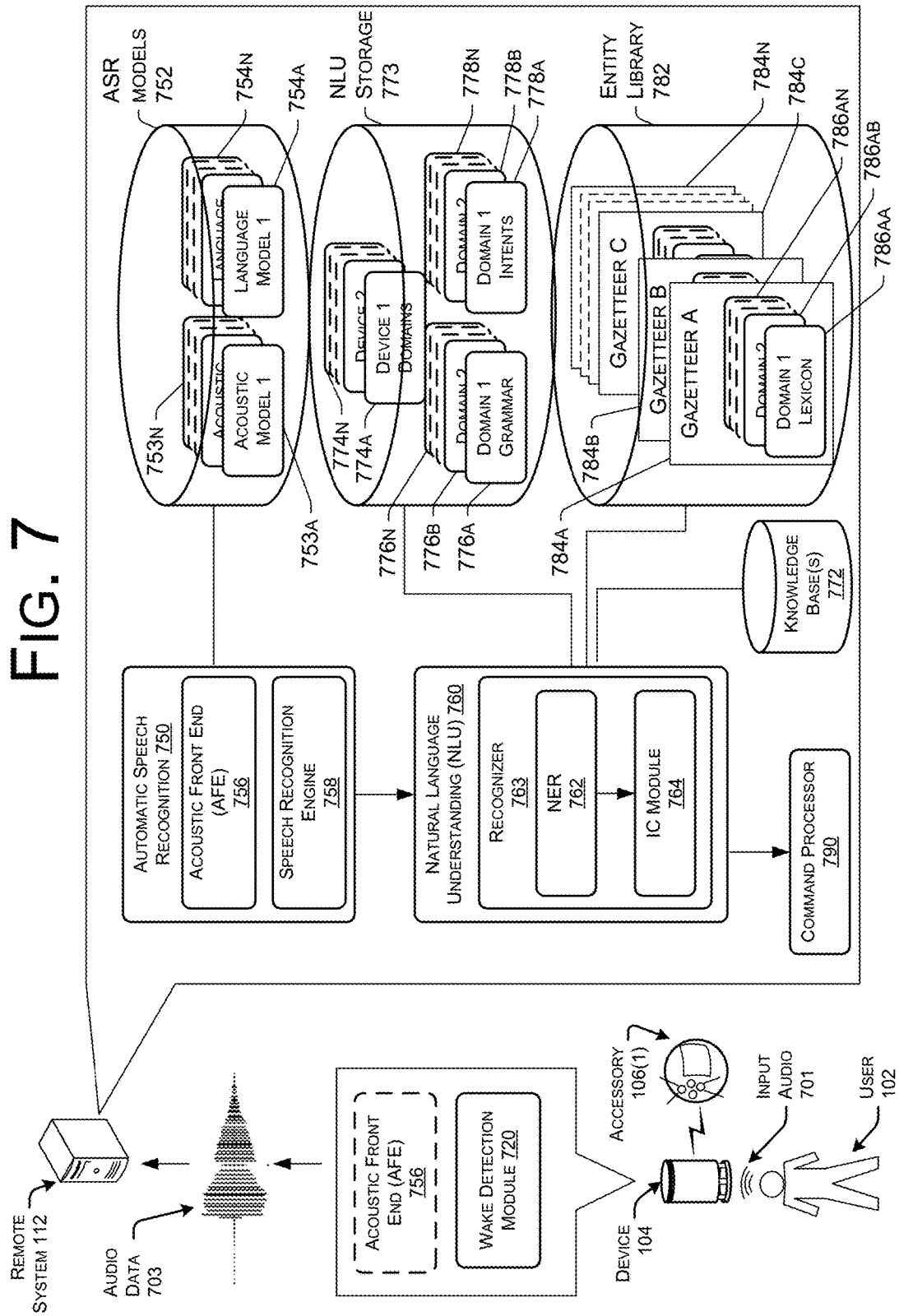
FIG. 7 is a conceptual diagram of components of a speech processing system of the remote system.

FIG. 7 is a conceptual diagram of how a spoken utterance can be processed, allowing a system to capture and execute commands spoken by a user 102, such as spoken commands that may follow a wakeword. The various components illustrated may be located on a same or different physical devices. Communication between various components illustrated in FIG. 7 may occur directly or across a network 114. An audio capture component, such as a microphone of device 104, captures audio 701 corresponding to a spoken utterance. The device 104, using a wakeword detection module 720, then processes the audio 701, or audio data corresponding to the audio 701, to determine if a keyword (such as a wakeword) is detected in the audio 701. Following detection of a wakeword, the device 104 sends audio data 703 corresponding to the utterance, to a computing device of the remote system 112 that includes an ASR module 750, which may be same or different and the speech-recognition system 124. The audio data 703 may be output from an acoustic front end (AFE) 756 located on the device 104 prior to transmission. Or, the audio data 703 may be in a different form for processing by a remote AFE 756, such as the AFE 756 located with the ASR module 750.

The wakeword detection module 720 works in conjunction with other components of the device 104, for example a microphone to detect keywords in audio 701. For example, the device 104 may convert audio 701 into audio data, and process the audio data with the wakeword detection module 720 to determine whether speech is detected, and if speech is detected, if the audio data comprising speech matches an audio signature and/or model corresponding to a particular keyword.

The device 104 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 701 received by the device 104 (or separately from speech detection), the device 104 may use the wakeword detection module 720 to perform wakeword detection to determine when a user 102 intends to speak a command to the device 104. This process may also be referred to as keyword detection, with the wakeword being a specific example of a keyword. Specifically, keyword detection may be performed without performing linguistic analysis, textual analysis or semantic analysis. Instead, incoming audio 701 (or audio data) is analyzed to determine if specific characteristics of the audio match preconfigured acoustic waveforms, audio signatures, or other data to determine if the incoming audio "matches" stored audio data corresponding to a keyword. The wakeword detection module 720 receives captured audio 701 and processes the audio 701 to determine whether the audio corresponds to particular keywords recognizable by the device 104 and/or remote system 112. Stored data relating to keywords and functions may be accessed to enable the wakeword detection module 720 to perform the algorithms and methods described herein. The speech models stored locally on the device 104 may be pre-configured based on known information, prior to the device 104 being configured to access the network by the user 102. For example, the models may be language and/or accent specific to a region where the user device 104 is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 104 prior to the user device 104 being delivered to the user or configured to access the network by the user. The wakeword detection module 720 may access the storage 408 and compare the captured audio to the stored models and audio sequences using audio comparison, pattern recognition, keyword spotting, audio signature, and/or other audio processing techniques.

Thus, the wakeword detection module 720 may compare audio data to stored models or data to detect a wakeword. One approach for wakeword detection applies general large vocabulary continuous speech recognition (LVCSR) systems to decode the audio data, with wakeword searching conducted in the resulting lattices or confusion networks. LVCSR decoding may require relatively high computational resources. Another approach for wakeword spotting builds hidden Markov models (HMM) for each key wakeword and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 104 may "wake" and begin transmitting audio data 703 corresponding to input audio 701 to the remote system 112 for speech processing. Audio data corresponding to that audio may be sent to a remote system 112 for routing to a recipient device or may be sent to the server for speech processing for interpretation of the included speech (either for purposes of enabling voice-communications and/or for purposes of executing a command in the speech). The audio data 703 may include data corresponding to the wakeword, or the portion of the audio data corresponding to the wakeword may be removed by the local device 104 prior to sending. Further, a local device 104 may "wake" upon detection of speech/spoken audio above a threshold, as described herein. Upon receipt by the remote system 112, an ASR module 750 may convert the audio data 703 into text data (or generate text data corresponding to the audio data 703). The ASR transcribes audio data 703 into text data representing the words of the speech contained in the audio data 703. The text data may then be used by other components for various purposes, such as executing system commands, inputting data, etc. A spoken utterance in the audio data 703 is input to a processor configured to perform ASR which then interprets the utterance based on the similarity between the utterance and pre-established language models 754 stored in an ASR model knowledge base (ASR Models Storage 752). For example, the ASR process may compare the input audio data 703 with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 750 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data 703 and divide the digitized audio data 703 into frames representing a time intervals for which the AFE 756 determines a number of values, called features, representing the qualities of the audio data 703, along with a set of those values, called a feature vector, representing the features/qualities of the audio data 703 within the frame. Many different features may be determined, as known in the art, and each feature represents some quality of the audio data 703 that may be useful for ASR processing. A number of approaches may be used by the AFE 756 to process the audio data 703, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE 756. For example, the device 104 may process audio data into feature vectors (for example using an on-device AFE 756) and transmit that information to a server across a network 114 for ASR processing. Feature vectors may arrive at the server encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR result(s) (or speech recognition result(s)) may be sent by the speech recognition engine 758 to other processing components, which may be local to the device performing ASR and/or distributed across the network(s) 114. For example, ASR results in the form of a single textual representation of the speech, an N-best list including multiple hypotheses and respective scores, lattice, etc. may be sent to a server, such as remote system 112, for natural language understanding (NLU) processing, such as conversion of the speech recognition result(s) (e.g., text data) into commands for execution, either by the device 104, by the remote system 112, by the accessory 106, or by another device (such as a server running a specific application like a search engine, etc.).

The device performing NLU processing 760 (e.g., remote system 112) may include various components, including potentially dedicated processor(s), memory, storage, etc. As shown in FIG. 7, an NLU component 760 may include a recognizer 763 that includes a named entity recognition (NER) module 762 which is used to identify portions of query text that correspond to a named entity that may be recognizable by the system. A downstream process called named entity resolution actually links a text portion to an actual specific entity known to the system. To perform named entity resolution, the system may utilize gazetteer information (784a-784n) stored in entity library storage 782. The gazetteer information may be used for entity resolution, for example matching ASR results (e.g., text data) with different entities (such as song titles, artist names, contact names, device names (e.g., natural language names for devices 104 and 106), etc.) Gazetteers may be linked to users (for example a particular gazetteer may be associated with a specific user's 102 music collection), may be linked to certain domains (such as music, shopping, etc.), or may be organized in a variety of other ways.

Generally, the NLU process takes textual input (such as processed from ASR 750 based on the utterance input audio 701) and attempts to make a semantic interpretation of the text data. That is, the NLU process determines the meaning behind the text data based on the individual words and then implements that meaning. NLU processing 760 (which may be the same or different than NLU component 126) interprets a text string to derive an intent (or a desired action from the user) as well as the pertinent pieces of information in the text data that allow a device (e.g., device 104) to complete that action. For example, if a spoken utterance is processed using ASR 750 and outputs the text data "What is the weather going to be like today?" the NLU process may determine that the user 102 intended to invoke the weather domain with an intent corresponding to the day's weather. The NLU may process several textual inputs related to the same utterance. For example, if the ASR 750 outputs N text segments (as part of an N-best list), the NLU 760 may process all N outputs to obtain NLU results.

As will be discussed further below, the NLU process may be configured to parse, tag, and annotate text as part of NLU processing. For example, the text data "What is the weather going to be like today?" may be parsed into words, and the word "what is" may be tagged as a command (to answer a question) and "weather" and "today" may each be tagged as a specific entity associated with the command. Further, the NLU process may be used to provide answer data in response to queries, for example using the knowledge base 772.

To correctly perform NLU processing of speech input, an NLU system 760 may be configured to determine a "domain(s)" of the utterance so as to determine and narrow down which services offered by the endpoint device (e.g., remote system 112 or device 104) may be relevant.

The NLU module 760 receives a query in the form of ASR results and attempts to identify relevant grammars and lexical information that may be used to construe meaning. To do so, the NLU module 760 may begin by identifying potential domains that may relate to the received query. The NLU storage 773 includes a databases of devices (774a-774n) identifying domains associated with specific devices. For example, the device 104 may be associated with domains for music, telephony, calendaring, contact lists, and device-specific communications, but not video. In some instances, some of the device domains 774a-774n may correspond to one or more "accessory-related" domains corresponding to one or more accessory devices 106. In addition, the entity library 782 may include database entries about specific services on a specific device, either indexed by Device ID, User ID, or Household ID, or some other indicator.

In NLU processing, a domain may represent a discrete set of activities having a common theme, and a user may request performance such activities by providing speech to a device 104. For instance, example domains may include, without limitation, domains for "shopping", "music", "calendaring", "reminder setting", "travel reservations", "to-do list creation", etc. Domains specific to the accessory device 106 may include, without limitation, a "lip synch" domain, a "dance along" domain, a "messaging" domain, a "game" domain, and the like. As such, each domain may be associated with a particular recognizer 763, language model and/or grammar database (776a-776n), a particular set of intents/actions (778a-778n), and a particular personalized lexicon (786aa-786an). Each gazetteer (784a-784n) may include domain-indexed lexical information associated with a particular user and/or device. For example, the Gazetteer A (784a) includes domain-index lexical information 786aa to 786an. A user's music-domain lexical information might include named entities such as album titles, artist names, and song names, for example, whereas a user's contact-list lexical information might include named entities such as the names of contacts. Since every user's music collection and contact list is presumably different, this personalized information improves entity resolution (i.e., identification of named entities from spoken utterances).

As noted above, in NLU processing, a query may be processed applying the rules, models, and information applicable to each identified domain. For example, if a query potentially implicates both an accessory-related domain (e.g., a "lip synch" domain, a "dance along" domain, etc.) and a music domain, the query may, substantially in parallel, be NLU processed using the grammar models and lexical information for the accessory-related domain (e.g., lip synch), and will be processed using the grammar models and lexical information for the music domain. When only a single domain is implicated by the received query (e.g., the "weather" domain), the responses based on the query produced by each set of models can be scored, with the overall highest ranked result from all applied domains selected to be the most relevant result. In other words, the NLU processing may involve sending the query (or ASR text data) to each available domain, and each domain may return a score (e.g., confidence) that the domain can service a request based on the query, the highest ranking score being selected as the most relevant result. For domains with equivalent scores, the NLU system 760 may determine the device 104 that sent the audio data 703 as a means for selecting one domain over the other. For example, if the device 104 does not include a display, a music domain may be selected over a video domain when the domain scores are otherwise equivalent. Alternatively, if the device 104 is primarily used as a display device for presenting video content, the video domain may be selected over the music domain when the domain scores are otherwise equivalent.

A single text query (based on a single utterance spoken by the user 102) may, in some instances, implicate multiple domains, and some domains may be functionally linked. The determination to implicate multiple domains from a single text query may be performed in a variety of ways. In some embodiments, the determination to implicate multiple domains may be based at least in part on metadata that indicates the presence of an accessory device 106 in the environment 108 with device 104. Such metadata can be sent from the device 104 to the remote system 112, and may be used by the NLU system 760 to determine whether to implicate multiple domains or a single domain. If, based on the metadata, it is determined that an accessory device 106 is present in the environment 108 with the device 104, the NLU system 760 may select an additional accessory-related domain, such as the lip synch domain, or the dance along domain, in order to control the operation of the accessory device 106 in coordination with music, as the music is audibly output via a speaker(s) of the device 104. This may be a default behavior that is invoked any time the user 102 requests the device 104 to play music (or any other suitable audio content), which may be changed in user settings pursuant to user preferences. In an example, the metadata can include an identifier of the device 104. This metadata may be sent to the remote system 112 along with the audio data 703, and upon receipt of such audio data 703 and metadata (e.g., a identifier of the device 104), the NLU system 760 may initially determine, based on the audio data 703, that the music domain is implicated by the spoken utterance "play Artist_Name." The NLU system 760 or the accessory component 130 may further utilize the metadata (e.g., the identifier of the device 104) to access a user profile (e.g., the customer registry 128) associated with the device 104. In this manner, the NLU system 760 or the accessory component 130 can determine whether any accessory devices 106 are associated with the user profile and/or the device 104 in question. Furthermore, the NLU system 760 or the accessory component 130 may attempt to determine an indication that the accessory 106 is in the environment 108 and powered on (or "online") so that the accessory 106 can be utilized in the manners described herein. For example, the user profile of the user 102 may be updated with information as to which accessories 106 in the environment 108 were "last seen" by the particular device 104. This may occur by pairing the device 104 with one or more accessories 106 in the environment 108, by detecting accessories in proximity to (i.e., within a threshold distance from) the device 104, and so on. The user profile of the user 102 can be dynamically updated with such "discovery" information as accessories 106 and devices 104 are moved around the environment 108, power cycled, and physically removed and brought within the environment 108.

In another example, metadata sent from the device 104 to the remote system 112 can include an identifier of the accessory 106 (or a user or user account associated with the accessory 106) that was obtained by the device 104. In this scenario, the device 104 may discover accessory devices 106 in the environment 108 prior to sending the audio data 703 to the remote system 112. Discovery of nearby accessory devices 106 can comprise determining that an accessory device(s) 106 are located anywhere in the environment 108 where the device 104 is located, determining that an accessory device(s) 106 is within a threshold distance from the device 104, and so on. Metadata in the form of an accessory 106 identifier can be used by the NLU system 760 or the accessory component 130 to determine whether the accessory device(s) 106 is registered to the same user 102 to which the device 104 is registered. This may be accomplished by accessing a user profile of the user 102 that is accessible to the remote system 112. In some embodiments, the device 104 can determine whether an accessory 106 is within a threshold distance from the device 104 based on a signal strength measurement between the device 104 and the accessory, or based on any other suitable distance/range determination technique known in the art.

Another manner by which the NLU system 760 can determine whether to implicate multiple domains from a single text query is by using a heuristic, such as a threshold score that is returned by any two or more functionally linked domains in response to an input query. For example, ASR text data corresponding to the spoken utterance "Tell Accessory_Device to sing to Artist_Name" may be sent to both the music domain and an accessory-related domain, among other domains, and the music domain may return a score of 100 (on a scale from 0 to 100), while the lip synch domain returns a score of 99 on the same scale. The scores from the highest ranking domain (here, the music domain) and any other domains that are functionally linked to the highest ranking domain (e.g., the lip synch domain, if the lip synch domain is functionally linked to the music domain) can be compared to a threshold score, and if the multiple scores meet or exceed the threshold score, the multiple domains may be selected for servicing the single request to "Tell Accessory_Device to sing to Artist_Name," thereby causing the accessory device 106 to sing along to the words in a song by Artist_Name. An additional check may be carried out using the metadata, as described above, to determine that an accessory device 106 is registered to the user and/or associated with (e.g., last seen by) the device 104. This additional check may be performed prior to implicating the multiple domains to ensure that an accessory device 106 is online and available for enabling coordinated operation of the accessory 106 and the device 104. In yet another embodiment, the NLU system 760 can determine to implicate multiple domains when an accessory-related entity (i.e., a named entity associated with an accessory 106) is identified in the ASR text data. For example, if the ASR text data includes a named entity, such as "Accessory_Device," multiple domains can be implicated in response to such identification of an accessory-related entity in the ASR text data. Again, an additional check may be carried out using the metadata to verify that an accessory 106 is present in the environment 108 and otherwise online and available for coordinating the operation of the accessory 106 with the operation of the device 104.

An intent classification (IC) module 764 parses the query to determine an intent(s) for each identified/selected domain, where the intent corresponds to the action to be performed that is responsive to the query. Each domain is associated with a database (778a-778n) of words linked to intents. For example, a music intent database may link words and phrases such as "quiet," "volume off," and "mute" to a "mute" intent, or may link words such as "sing," "mouth the words," and "lip synch" to a "lip synch" intent. The IC module 764 identifies potential intents for each identified domain by comparing words in the query to the words and phrases in the intents database 778. The determination of an intent by the IC module 764 is performed using a set of rules or templates that are processed against the incoming text data to identify a matching intent.

In order to generate a particular interpreted response, the NER 762 applies the grammar models and lexical information associated with the respective domains to recognize one or more entities in the text of the query. In this manner the NER 762 identifies "slots" (i.e., particular words in query text) that may be needed for later command processing. Depending on the complexity of the NER 762, it may also label each slot with a type of varying levels of specificity (such as noun, place, city, artist name, song name, device name, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC module 764 are linked to domain-specific grammar frameworks (included in 776) with "slots" or "fields" to be filled. Each slot/field corresponds to a portion of the query text that the system believes corresponds to a named entity. For example, if "play music" is an identified intent, a grammar (776) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 762 may parse the query to identify words as subject, object, verb, preposition, etc., based on grammar rules and/or models, prior to recognizing named entities. The identified verb may be used by the IC module 764 to identify an intent, which is then used by the NER module 762 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The output data from the NLU processing (which may include tagged text, commands, etc.) may be sent to a command processor 790, which may be located on a same or separate remote system 112. In some instances, the command processor 790 work in conjunction with one or more speechlets (or speechlet engines) that are configured to determine a response for the processed query, determine locations of relevant information for servicing a request from the user 102 and/or generate and store the information if it is not already created, as well as route the identified intents to the appropriate destination command processor 790. The destination command processor 790 may be determined based on the NLU output. For example, if the NLU output includes a command to play music (play music intent), the destination command processor 790 may be a music playing application, such as one located on device 104 or in a music playing appliance, configured to execute a music playing command. The command processor 790 for a music playing application (for the play music intent) may retrieve first information about a first storage location where audio content associated with the named entity is stored. For example, the music playing command processor 790 may retrieve a URL that is to be used by the device 104 to stream or download audio content corresponding to the named entity; in this example, music content by the fictitious performing artist "Artist_Name." The source (i.e., storage location) of the audio content may be part of the remote system 112, or may be part of a third party system that provides a service for accessing (e.g., streaming, downloading, etc.) audio content. If the NLU output includes a command to have the accessory device 106 dance along to the music played by the music playing application, the destination command processor 790 may include a dance along control application, such as one located on accessory device 106 or on a remote server of the system 112, configured to execute the dance along instruction, or any suitable "stream along" instruction that causes coordinated operation of the accessory device 106 and the device 104. For example, the accessory device 106 may include a display whereupon supplemental content associated with the main audio content output by the device 104 is presented in a synchronized manner with the output of the main audio content by the device 104.

It is to be appreciated that the remote system 112 may utilize a first protocol to communicate, send, or otherwise transmit data and information to device(s) 104, and a second, different protocol to communicate, send, or otherwise transmit data and information to the accessory device(s) 106. One reason for this is that the accessory device 106 may not be configured to process speech, and the device 104 may be configured to process speech. As such, the remote system 112 can utilize a one-way communication channel to transmit data and information to the accessory device(s) 106 via the network(s) 114, while using a two-way communication channel to transmit data and information to, and receive data and information from, the device(s) 104. In an example, the remote system 112 can utilize a message processing and routing protocol, such as an Internet of Things (IoT), that supports Hypertext Transfer Protocol (HTTP), WebSockets, and/or MQ Telemetry Transport (MQTT), among other protocols, for communicating data and information to the accessory device(s) 106.

The destination command processor 790 used to control the operation of the accessory device 106 in coordination with main content output by the device 104 may be configured to retrieve preconfigured control information, or the command processor can generate, either by itself or by invoking other applications and/or services, the control information that is ultimately sent to the accessory device 106 for enabling coordinated control of the accessory device 106 with the output of content by the device 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 760 during runtime operations where NLU operations are performed on text data (such as text output from an ASR component 750). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer 763 may include various NLU components such as an NER component 762, IC module 764 and other components such as an entity resolver, or other components.

For example, a music domain recognizer 763-A (first domain) may have an NER component 762-A that identifies what slots (i.e., portions of input text data) may correspond to particular words relevant to that domain. The words may correspond to entities such as (for the music domain) a performer, album name, song name, etc. An NER component 762 may use a machine learning model, such as a domain specific conditional random field (CRF) to both identify the portions corresponding to a named entity as well as identify what type of entity corresponds to the text portion. For example, for the text data "play songs by the stones," an NER 762-A trained for a music domain may recognize the portion of text [the stones] corresponds to a named entity and an artist name. The music domain recognizer 763-A may also have its own intent classification (IC) component 764-A that determines the intent of the text data assuming that the text data is within the proscribed domain. An IC component 764 may use a model, such as a domain specific maximum entropy classifier to identify the intent of the text data, where the intent is the action the user desires the system to perform.

Upon identification of multiple intents (e.g., a first intent associated with a first domain, and a second intent associated with a second domain), the command processors 790 invoked by the NLU system 760 can cause information and instructions to be sent to the devices 104 and 106 in the environment 108. For example, first information (e.g., a first URL or similar storage location information) can be sent over the network 114 to the device 104 to inform the device 104 of a first storage location where main content (e.g., audio content) associated with the named entity is stored, the first information being usable to access (e.g., stream or download) the main content. The command processor 790 can also cause a first instruction corresponding to the first intent to be sent to the device 104 which informs the device 104 as to a particular time (i.e., a time specified in the first instruction) to initiate playback of the main content. Another command processor 790 for the accessory device 106 can send second information (e.g., a second URL or similar storage location information) over the network 114 (either directly or routed through the device 104) to the accessory device 106 to inform the accessory device 106 of a second storage location where control information and/or supplemental content associated with the main content is stored, the second information being usable to access (e.g., stream or download) the control information and/or the supplemental content. The command processor 790 can also cause a second instruction corresponding to the second intent to be sent to the accessory device 106 which informs the accessory device 106 as to a particular time to begin processing the control information and/or the supplemental content. The control information, upon execution by the accessory device 106, may control the operation of a component(s) of the accessory device 106 (e.g., lights, display, movable member(s), etc.) in coordination with the output of the main content. For example, the control information may cause a movable mouth of the accessory device 106 to open/close along with the words of a song output by the speaker(s) of the device 104.

Multiple devices may be employed in a single speech processing system. In such a multi-device system, each of the devices may include different components for performing different aspects of the speech processing. The multiple devices may include overlapping components. The components of the devices 104 and remote resource 116 are exemplary, and may be located a stand-alone device or may be included, in whole or in part, as a component of a larger device or system.

Figure 8:
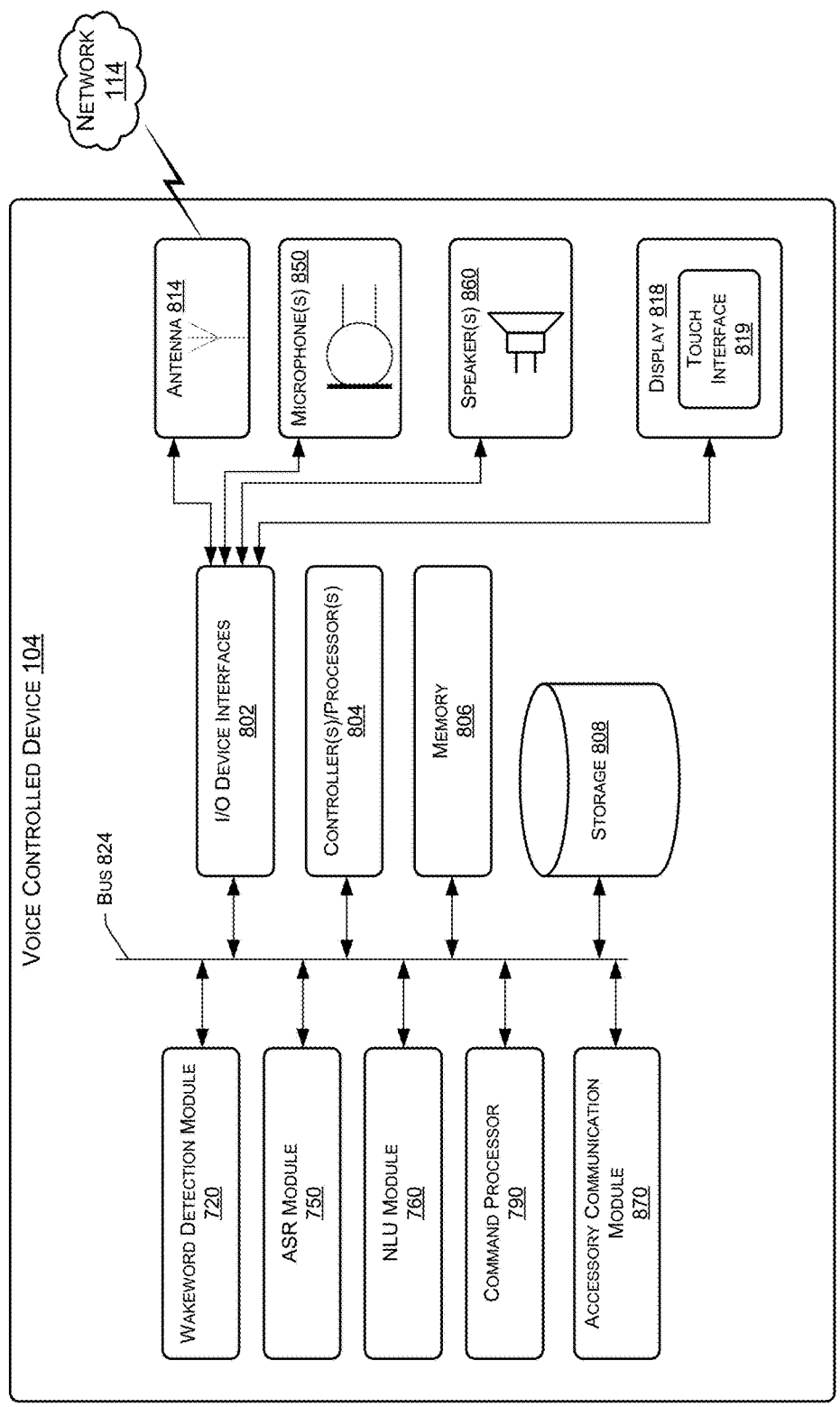
FIG. 8 is a block diagram conceptually illustrating example components of the device of FIG. 1.
Figure 9:
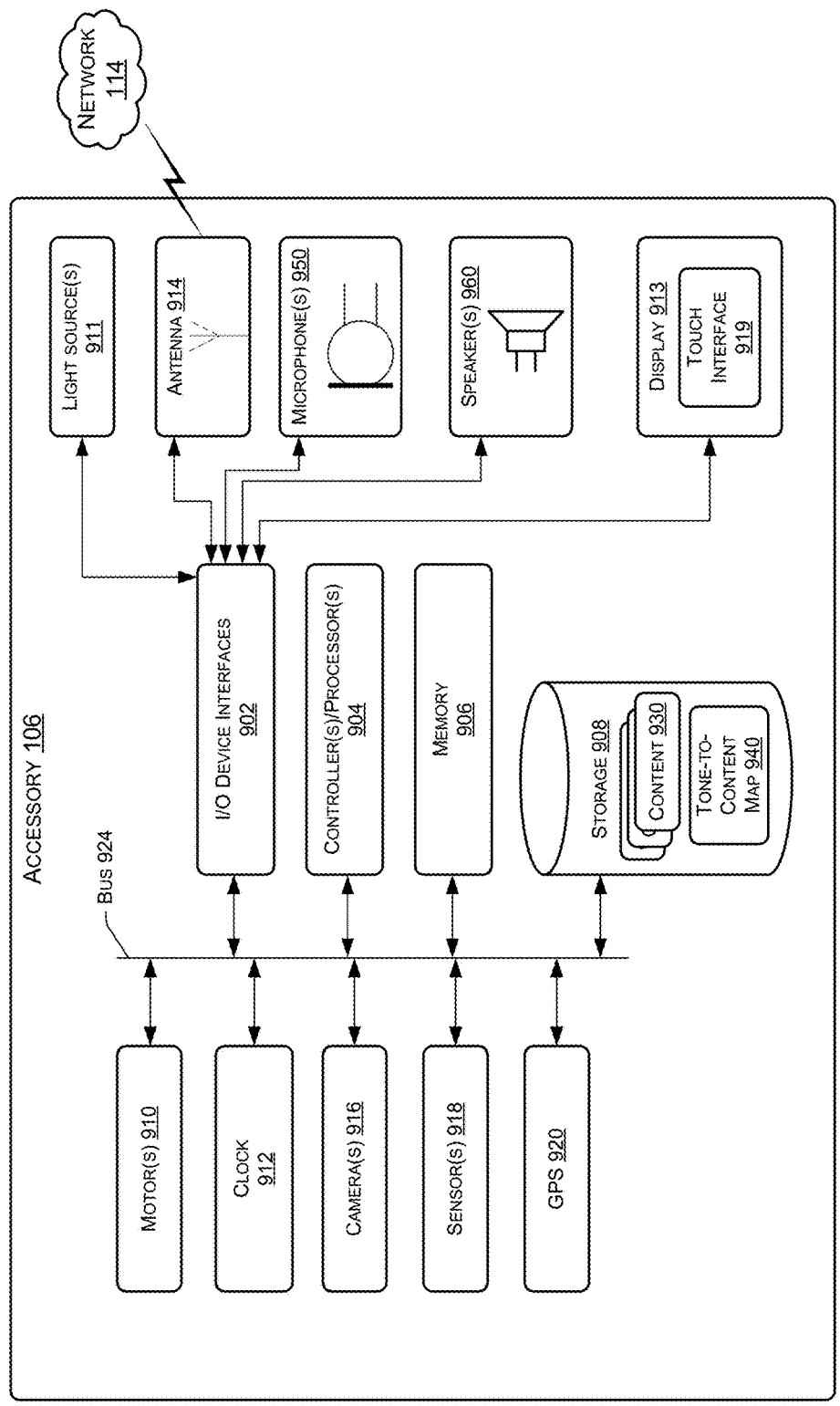
FIG. 9 is a block diagram conceptually illustrating example components of an accessory device, such as those shown in FIG. 1.

FIG. 8 is a block diagram conceptually illustrating example components of a device, such as the device 104, according to embodiments of the present disclosure. FIG. 9 is a block diagram conceptually illustrating example components of an accessory device 106 according to embodiments of the present disclosure. In operation, each of these devices (or groups of devices) may include computer-readable and computer-executable instructions that reside on the respective device (104/116), as will be discussed further below.

The device 104 may be implemented as a standalone device 104 that is relatively simple in terms of functional capabilities with limited input/output components, memory, and processing capabilities. For instance, the device 104 may not have a keyboard, keypad, or other form of mechanical input. The device 104 may also lack a display (other than simple lights, for instance) and a touch screen to facilitate visual presentation and user touch input. Instead, the device 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 104. Nonetheless, the primary, and potentially only mode, of user interaction with the device 104 is through voice input and audible output. In some instances, the device 104 may simply comprise a microphone 850, a power source (e.g., a battery), and functionality for sending generated audio data 703 via an antenna 814 to another device.

The device 104 may also be implemented as more sophisticated computing device, such as a computing device similar to, or the same as, a smart phone or personal digital assistant. The device 104 may include a display 818 with a touch interface 819 and various buttons for providing input as well as additional functionality such as the ability to send and receive telephone calls. Alternative implementations of the device 104 may also include configuration as a personal computer 104. The personal computer 104 may include a keyboard, a mouse, a display screen 818, and any other hardware or functionality that is typically found on a desktop, notebook, netbook, or other personal computing devices. In an illustrative alternative example, the device 104 can comprise an automobile, such as a car, and the accessory device 106 can be disposed in the car and connected, via wired or wireless coupling, to the car acting as the device 104. In yet another example, the device 104 can comprise a pin on a user's clothes or a phone on a user's person, and the accessory device 106 can comprise an automobile, such as a car, that operates in coordination with the pin or phone, as described herein. In yet another example, the device 104 can omit the speaker(s) 860, and may include the microphone(s) 850, such that the device 104 can utilize speaker(s) of an external or peripheral device to output audio via the speaker(s) of the external/peripheral device. In this example, the device 104 might represent a set-top box (STB), and the device 104 may utilize speaker(s) of a television that is connected to the STB for output of audio via the external speakers. In yet another example, the device 104 can omit the microphone(s) 850, and instead, the device 104 can utilize a microphone(s) of an external or peripheral device to detect audio. In this example, the device 104 may utilize a microphone(s) of a headset that is coupled (wired or wirelessly) to the device 104. These types of devices are merely examples and not intended to be limiting, as the techniques described in this disclosure may be used in essentially any device that has an ability to recognize speech input or other types of natural language input.

Each of these devices (104/106) of FIGS. 8 and 9 may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device (104/106) may also include a data storage component (808/908), for storing data and controller/processor-executable instructions. Each data storage component may individually include one or more non-volatile storage types such as magnetic storage, optical storage, solid-state storage, etc. Each device (104/106) may also be connected to removable or external non-volatile memory and/or storage (such as a removable memory card, memory key drive, networked storage, etc.) through respective input/output device interfaces (802/902).

Computer instructions for operating each device (104/106) and its various components may be executed by the respective device's controller(s)/processor(s) (804/904), using the memory (806/906) as temporary "working" storage at runtime. A device's (104/106) computer instructions may be stored in a non-transitory manner in non-volatile memory (806/906), storage (808/908), or an external device(s). Alternatively, some or all of the executable instructions may be embedded in hardware or firmware on the respective device (104/106) in addition to or instead of software.

Each device (104/106) includes input/output device interfaces (802/902). A variety of components may be connected through the input/output device interfaces (802/902). Additionally, each device (104/106) may include an address/data bus (824/924) for conveying data among components of the respective device. Each component within a device (104/106) may also be directly connected to other components in addition to (or instead of) being connected to other components across the bus (824/924).

The devices (104/106) may each include a display (818/913), which may comprise a touch interface (819/919). Any suitable display technology, such as liquid crystal display (LCD), organic light emitting diode (OLED), electrophoretic, and so on, can be utilized for the displays (818). Furthermore, the processor(s) (804/904) can comprise graphics processors for driving animation and video output on the associated displays (818/913). Or the device (104/106) may be "headless" and may primarily rely on spoken commands for input. As a way of indicating to a user that a connection between another device has been opened, the device (104/106) may be configured with one or more visual indicator, such as the light source(s) of the accessory 106, which may be in the form of an LED(s) or similar component, that may change color, flash, or otherwise provide visible light output, such as for a light show on the accessory 106, or a notification indicator on the device (104/106). The device (104/106) may also include input/output device interfaces (802/902) that connect to a variety of components such as an audio output component such as a speaker (860/960) for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device (104/106). The device (104/106) may also include an audio capture component. The audio capture component may be, for example, a microphone (850/950) or array of microphones, a wired headset or a wireless headset, etc. The microphone (850/950) may be configured to capture audio. If an array of microphones is included, approximate distance to a sound's point of origin may be performed using acoustic localization based on time and amplitude differences between sounds captured by different microphones of the array. The device 104 (using microphone 850, wakeword detection module 720, ASR module 750, etc.) may be configured to generate audio data 703 corresponding to detected audio 701. The device 104 (using input/output device interfaces 802, antenna 814, etc.) may also be configured to transmit the audio data 703 to the remote system 112 for further processing or to process the data using internal components such as a wakeword detection module 720. In some configurations, the accessory device 106 may be similarly configured to generate and transmit audio data 703 corresponding to audio 701 detected by the microphone(s) 950.

Via the antenna(s) (814/914), the input/output device interfaces (802/902) may connect to one or more networks 114 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices (104/106) via wired connection to an external alternating current (AC) outlet, and/or via onboard power sources, such as batteries, solar panels, etc.

Through the network(s) 114, the speech processing system may be distributed across a networked environment. Accordingly, the device 104 and/or resource 116 of the remote system 112 may include an ASR module 750. The ASR module in device 104 may be of limited or extended capabilities. The ASR module 750 may include the language models 754 stored in ASR model storage component 752, and an ASR module 750 that performs the automatic speech recognition process. If limited speech recognition is included, the ASR module 750 may be configured to identify a limited number of words, such as keywords detected by the device, whereas extended speech recognition may be configured to recognize a much larger range of words.

The device 104 and/or the resource 116 of the remote system 112 may include a limited or extended NLU module 760. The NLU module 760 in device 104 may be of limited or extended capabilities. The NLU module 760 may comprising the name entity recognition module 762, the intent classification module 764 and/or other components. The NLU module 760 may also include a stored knowledge base and/or entity library, or those storages may be separately located.

The device 104 and/or the resource 116 of the remote system 112 may also include a command processor 790 that is configured to execute commands/functions associated with a spoken command as described herein.

The device 104 may include a wakeword detection module 720, which may be a separate component or may be included in an ASR module 750. The wakeword detection module 720 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 104 may be configured collectively to identify a set of the directional audio signals in which the wake expression is detected or in which the wake expression is likely to have occurred.

With reference again to the accessory device 106 of FIG. 9, the accessory 106 can include a housing, which is shown in the figures, merely by way of example, as a spherical housing, although the accessory housing is not limited to having a spherical shape, as other shapes including, without limitation, cube, pyramid, cone, or any suitable three dimensional shape is contemplated. In some configurations, the housing of the accessory takes on a "life-like" form or shape (such as an animatronic toy) that is shaped like an animal, an android, or the like. Accordingly, the accessory 106 can comprise movable or actuating (e.g., pivoting, translating, rotating, etc.) members (e.g., a movable mouth, arms, legs, tail, eyes, ears, etc.) that operate in accordance with control signals 108 received from the device 104. The accessory 106 can include one or multiple motors 910 for use in actuating such movable members. In this sense, the accessory 106 can be "brought to life" by the user 102 issuing voice commands 110 to the device 104, and the device 104 responding by controlling the operation of the accessory's 106 various components.

The accessory 106 may be configured (e.g., with computer-executable instructions stored in the memory 906) to select, or toggle, between multiple available modes based on commands (or instructions) received from the remote system 112 (in some cases, via the device 104), or based on user input received at the accessory 106 itself. For example, the user 102 can ask the device 104 to set the accessory 106 in a particular mode of operation (e.g., a lip synch mode, a dance mode, a game play mode, etc.) among multiple available modes of operation, and the accessory 106 can select the particular mode to cause various components (e.g., the light sources, the display, etc.) to operate in a particular manner based on the selected mode of operation. Additionally, the accessory 106 can select a mode of operation based on a current "mood" (e.g., happy, sad, etc.) of the accessory 106, which the accessory 106 may receive periodically from the remote system 112 directly or via the device 104, or the accessory 106 may periodically change "moods" among multiple available moods based on internal logic. Available modes of operation for selection can include, without limitation, a setup mode, a dance mode, a lip synch mode, a play (or game) mode, an emoji mode, an offline mode, a message mode, and so on.

A camera 916 can be mounted on the accessory 106 and utilized for purposes like facial recognition and determining the presence or absence of a user in the vicinity of the accessory 106 based on movement detection algorithms, etc. The camera 916 can also be used for locating the user 102 when the user 102 emits an audio utterance in the vicinity of the accessory 106. Alternative methods, such as echo-location and triangulation approaches, can also be used to locate the user in the room.

The accessory 106 can include additional sensors 918 for various purposes, such as accelerometers for movement detection, temperature sensors (e.g., to issue warnings/notifications to users in the vicinity of the accessory, and other types of sensors 918. A GPS 920 receiver can be utilized for location determination of the accessory 106.

The display 913 can present different games, like trivia, tic-tac-toe, etc. during play mode. Trivia games can be selected from among various categories and education levels to provide questions tailored to the specific user (e.g., math questions for a child learning basic math, etc.). Fortune teller mode may allow the accessory 106 to output a fortune as a TTS output for the user 102 (e.g., a fortune for the day, week, or month, etc.). Trapped in the ball mode may show a digital character on the display 913 and/or via the light sources 111 that is "trapped" inside the translucent housing of the accessory 106, looking for a way to get out, and the user 102 can interact with voice commands 110 detected by the device 104 and forwarded via control signals 108, to help the digital character escape the confines of the accessory 106.

Emoji mode may be another sub-type of play mode that causes the display 913 of the accessory 106 to present an Emoji of multiple available Emoji's that can lip-sync to music, and otherwise interact in various play modes, such as by voicing TTS output for storytelling, joke telling, and so on.

Offline mode may cause the accessory 106 to operate according to a subset of operations (e.g., a subset of jokes, stories, songs, etc.) stored in local memory of the accessory 106. This may be useful in situations where the accessory 106 is not connected to a network (e.g., a WiFi network), such as if the user 102 takes the accessory 106 on a road trip and the accessory 106 is outside of any available network coverage areas. A push button on the housing of the accessory 106, or a soft button on a touch screen of the display 913, can allow for the user 102 to easily engage the offline mode of the accessory 106, such as when the device 104 is unavailable or powered off.

The setup mode may allow the user 102 to configure the accessory 106, and the accessory 106 may demonstrate various ones of the available modes of operation during the setup mode. Set-up of the accessory 106 can be substantially "low-friction" in the sense that it is not overly complicated and does not require that the user interact with the accessory at all, other than powering the accessory 106 on, thereby allowing the user 102 to enjoy the accessory 106 quickly upon purchase. A companion application can be installed (e.g., downloaded) on a mobile device of the user 102 to interface with the accessory 106, such as to set-up the accessory (should the user choose not to use voice commands 110 for set-up). Such a companion application on a mobile device of the user 102 can also be used for messaging mode of the accessory 106, such as to send a message that is output (e.g., displayed, output via audio on speakers, etc.) of the accessory 106. For instance, a parent, guardian, or friend connected to the same account of the user 102 can send a message via the companion application to be output through the output device(s) of the accessory 106. Upon receipt of a message, the accessory 106 can provide a notification of the received message (e.g., activation of a light source(s), presenting a message icon on the display 913, etc.), and may wait to playback the message until the user 102 requests playback of the message (e.g., via a voice command 110). Content can be updated at multiple different times (e.g., periodically, in response to a trigger, etc.) on the accessory 106 via the wireless interface of the accessory 106. In some configurations, parental consent can be enabled for the accessory 106 to restrict the accessory 106 to performing particular operations when a minor or child is detected via unique voice identification. The user can customize colors of the light sources, voices for TTS output via the accessory 106, and other customizable features in the setup mode.

The memory 906 of the accessory 106 can store computer-executable instructions that, when executed by the controller(s)/processor(s) 904, cause the accessory 106 to discover other accessories 106 registered to the user 102. The accessory 106 may be configured to publish an identifier (e.g., an IP address) for this purpose that is sent to the remote system 112, and each accessory may receive identifiers of all other accessories registered to the user 102 from the remote system 112. In this manner, accessories 106 can recognize each other and perform in a synchronized or meaningful way. Any suitable network protocol (e.g., UPnP) can be utilized to connect devices in this manner. Devices can also communicate using high frequency (i.e., inaudible to humans) tones and a modulator-demodulator algorithm to transmit data over audio. Accessories 106 can "banter" back and forth, such as by outputting audio, which is received by the device 104 and processed in a similar manner to audio detected as coming from the user 102, and thereafter, sending control signals 134 to an appropriate accessory 106 that is to respond to another accessory 106.

Computer-executable instructions may be stored in the memory 906 of the accessory 106 that, when executed by the controller(s)/processor(s) 904, cause various components of the accessory 106 to operate in a synchronized manner (i.e., in coordination) with audio output via speakers of the device 104 and/or via speakers of the accessory 106. For example, accessory device 106 may be configured to process control information that it receives from the remote system 112 (possibly routed through the device 104), and which is associated with an audio file or other TTS data that is to be output as synthesized speech output. In this manner, the accessory 106 can display digital animations on the display 913, operate the light sources 111, and/or actuate movable members of the accessory 106 in synchronization with the audio (e.g., an audio file, TTS response, etc.). Accordingly, the accessory 106 may receive the control information, possibly along with the associated audio file.

For time synchronization, the accessory 106 may include a clock 912 that can be referenced and correlated with clocks of other devices (e.g., other accessories 106, devices 104, etc.) via offset and skew parameters to allow the accessory 106 to maintain synchronization with other accessories 106 and/or with the device 104, such as when a group of accessories 106 "dances" to the same song, or when the accessory device 106 is to operate in a synchronized manner with audio output by the device 104. For instance, the device 104 can utilize an accessory communication module 870 to send time synchronization information (e.g., sending timestamps) to the accessory device 106, and the accessory device 106 can return time synchronization information (e.g., returning timestamps) to the device 104, which can be used to calculate offset and skew parameters so that respective clocks of the devices 104 and 106 (or clocks of multiple accessory devices 106) can be synchronized so that operation of the accessory 106 and the device 104 can be synchronized. The clock may also be used as a timer that, when expired, can emit a character specific sound to act as an alarm clock, a kitchen timer, etc. The accessory communication module 870 can further be utilized by the device 104 to communicate any suitable information and data to the accessory 106, such as the forwarding of a second instruction and second information, and/or forwarding of control information and/or supplemental content to the accessory 106, such as when the device 104 acts as a pass-through device that obtains information from the remote system 112 and sends the information to the accessory 106.

FIG. 9 further illustrates that the storage 908 of the accessory 106 may store one or more pieces of supplemental content 930, as well as a tone-to-content map 930. As described above, the accessory device 106 may include one or more microphones 950, that may generate audio data based on captured audio. In some instances, the microphones may generate audio data based on high-frequency audio data output by a primary device, such as a device 104. The accessory device 106 may include hardware and/or software capabilities for analyzing the generated audio data to identify supplemental content referenced in the audio. That is, logic of the accessory device 106 may identify a tone or pattern of tones in the high-frequency audio and, using the tone-to-content map 940, determine the supplemental content to output on the one or more output devices of the accessory 106. In some instances, the content is stored locally as content 930 and, therefore, the accessory outputs the locally stored content in response to identifying the appropriate content using the map 940. In other instances, the accessory device acquires the supplemental content from a remote location.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Figure 10:
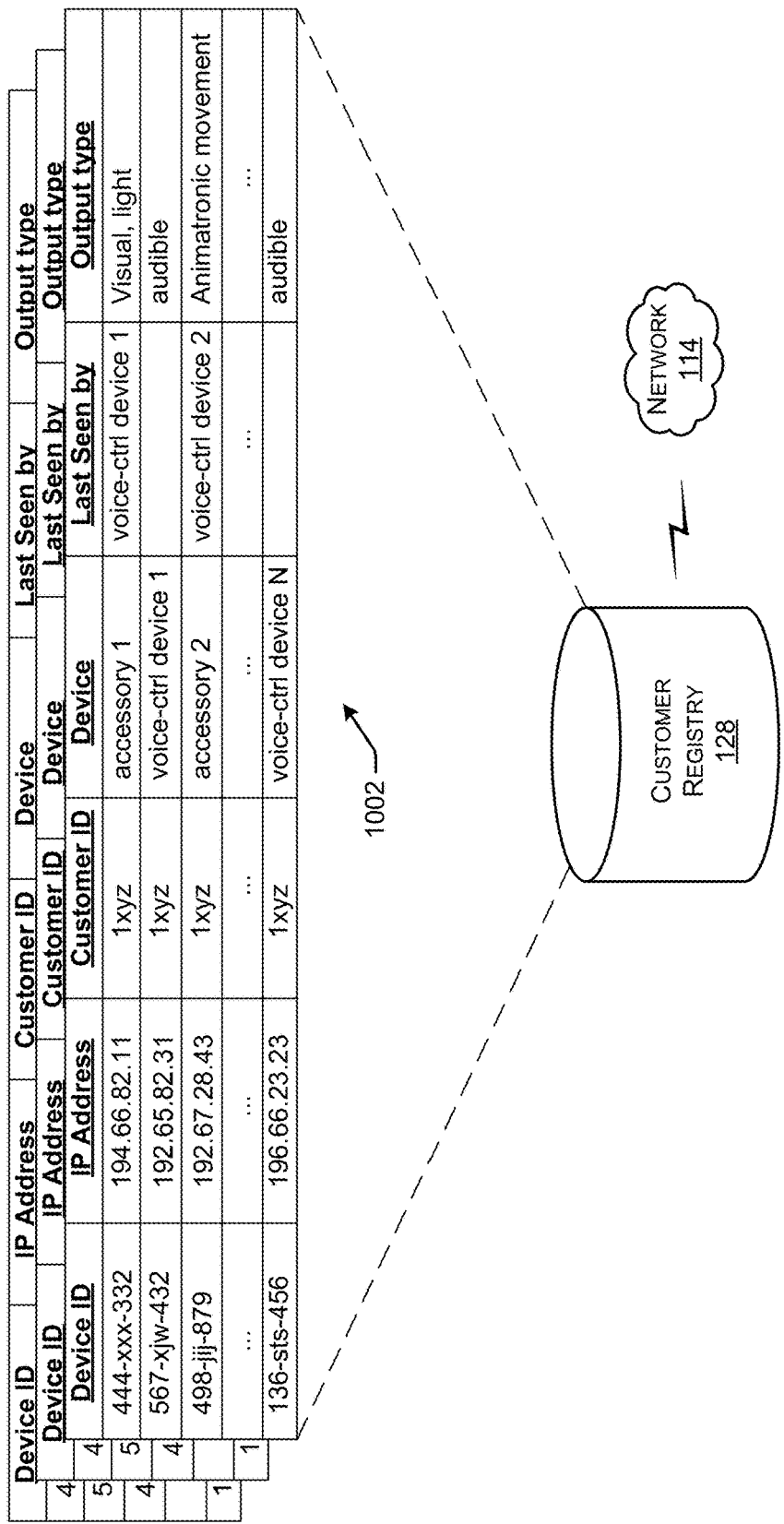
FIG. 10 shows example data stored in a customer registry, which the remote system of FIG. 1 may maintain.

FIG. 10 illustrates an example customer registry 128 that includes data regarding user profiles as described herein. The customer registry 128 may be located part of, or proximate to, the remote system 112, or may otherwise be in communication with various components, for example over the network 114. The customer registry 128 may include a variety of information related to individual users, accounts, etc. that interact with the device 104, the accessory 106, and the remote system 112. For illustration, as shown in FIG. 10, the customer registry 128 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device.

A particular user profile 1002 may include a variety of data that may be used by the system. For example, a user profile 1002 may include information about what accessories 106 are associated with the user 102 and/or device 104. The profile 1002 may include, for accessory devices 106, a device 104 by which the accessory was "last seen." In this manner, as the user 102 moves an accessory 106 about the environment 108 (e.g., from the kitchen to a bedroom of the user's 102 house) that includes multiple devices 104, the accessory device 106 can wirelessly pair with a closest device 104 in proximity to the accessory device 106 and this information can be sent to the remote system 112 to dynamically update the profile 1002 with the device 104 that was last paired with the accessory 106. This accessory-to-device (106-to-104) association can be dynamically updated as locations of the devices 104 and 106 change within the environment 108. Furthermore, the remote system 112 can use these accessory-to-device (106-to-104) associations to determine which devices 104 and 106 to send information and instructions to in order to coordinate the operation of an accessory 106 with an appropriate device 104. The profile 1002 may also include information about how a particular accessory 106 may operate (e.g., display 913 output, light source operation, animatronic movement, audio output, etc.). A user profile 1002 also contain a variety of information that may be used to check conditional statements such as address information, contact information, default settings, device IDs, user preferences, or the like.

Figure 11:
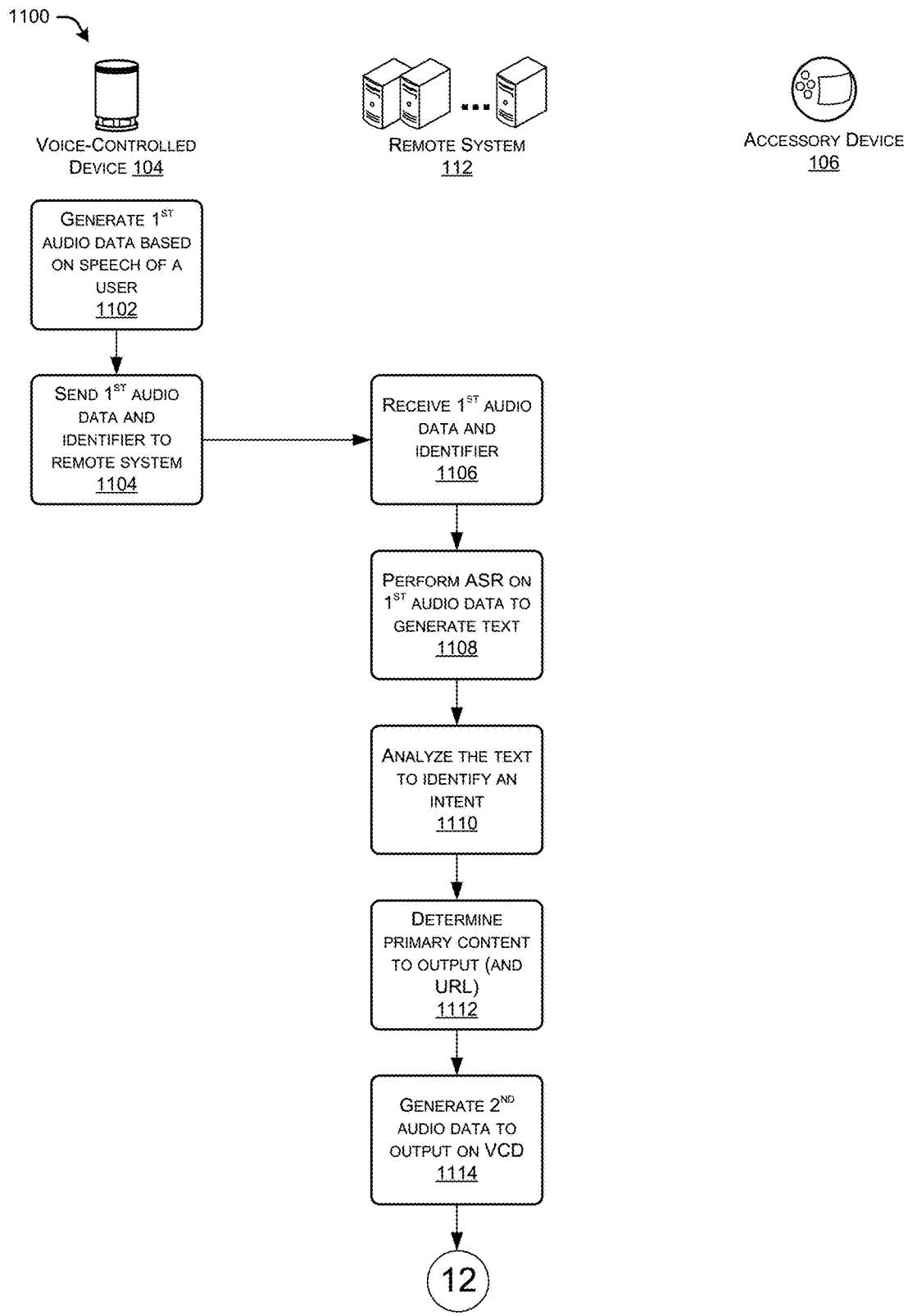
FIGS. 11-13 collectively illustrate an example process for encoding instructions in high-frequency audio data for causing an accessory device to output content in an environment.
Figure 12:
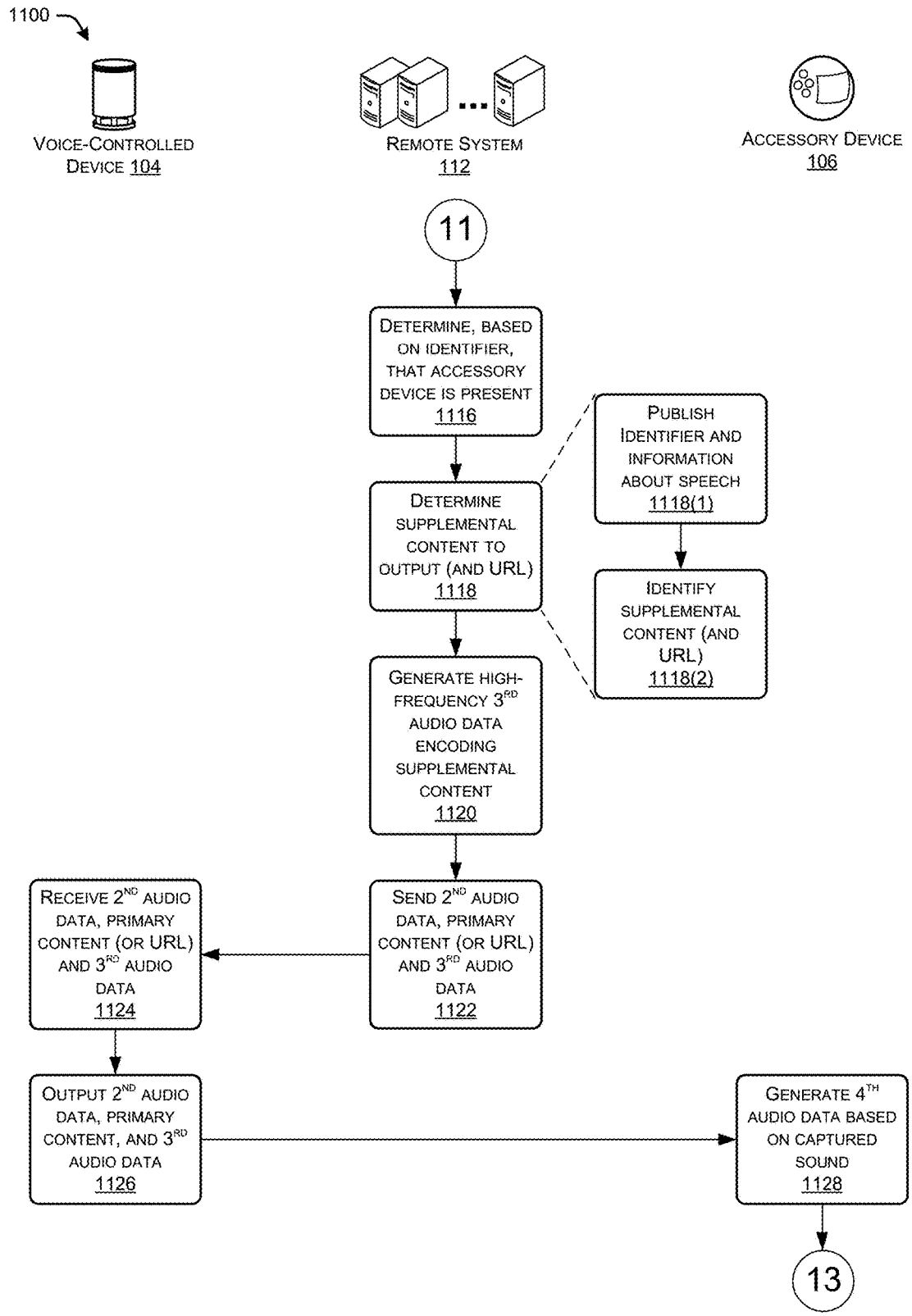
Figure 13:
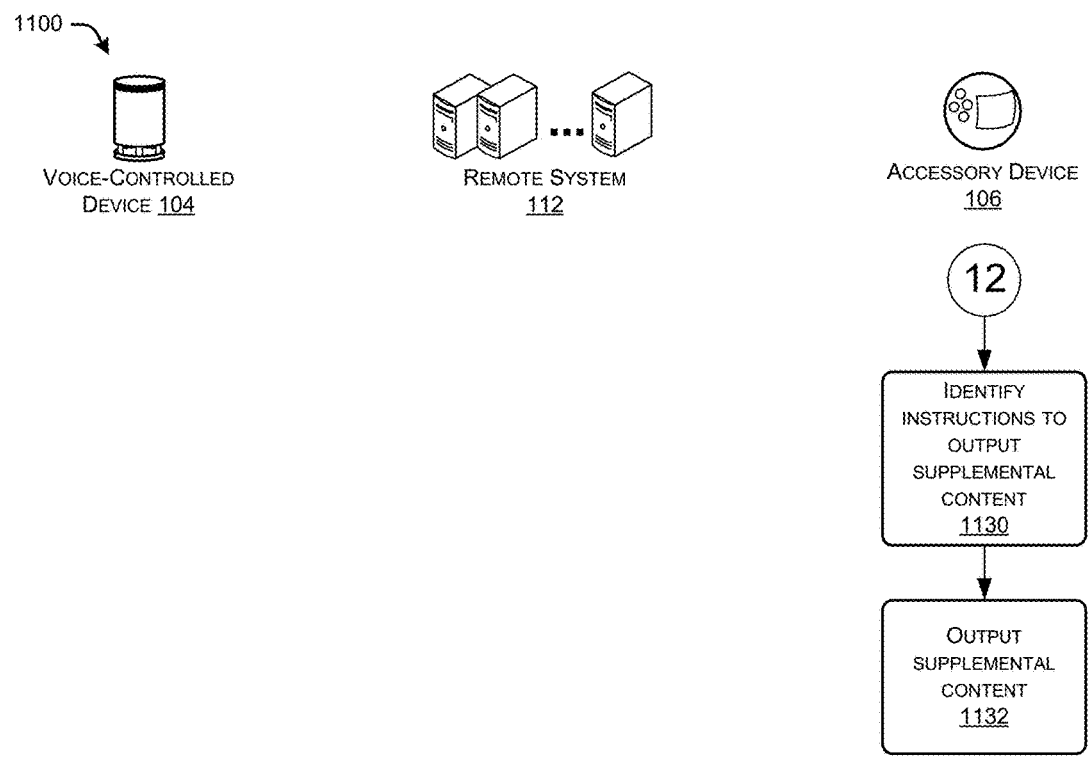

FIGS. 11-13 collectively illustrate an example process 1100 for encoding instructions in high-frequency audio data for causing an accessory device to output content in an environment. The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 1102, a primary device, such as the device 104, generates first audio data based on speech of a user. At 1104, the device 104 sends this first audio data and an identifier (e.g., an identifier of the device 104) over the network to the remote system, which receives this information at 1106. At 1108, the remote system performs ASR on the first audio data to generate text and, at 1110, analyzes the text to identify a domain and/or an intent associated with the text. For instance, if the text was: "what is the weather today?", the remote system may determine that the text is associated with the "weather" domain and the intent corresponds to a "current weather" intent.

At 1112, the remote system 112 determines primary content to output on the device 104 or another device in the environment based on the domain and/or intent. Additionally or alternatively, the remote system 112 may determine a storage location (e.g., a URL) for acquiring the primary content, such as a URL corresponding to a third-party weather application that is configured to output audio data corresponding to the day's weather at the location associated with the device. At 1114, the remote system may generate second audio data to output on the device or another device in the environment. The second audio data may comprise the primary content itself (e.g., the day's weather forecast), or additional data (e.g., an introduction such as "here is today's weather"), which may be followed by the primary content available at the storage location.

FIG. 12 continues the illustration of the process 1100 and includes, at 1116, the remote system 112 determining, based on the identifier received from the device 104, that at least one accessory device is present in the environment of the device 104. That is, the accessory component 130 may have identified a user account of profile associated with the device and may have determined a particular accessory device having been registered with the account. Further, the user profile may indicate that the accessory device has been seen recently by the device 104.

At 1118, the remote system determines supplemental content to output on the accessory device, and/or a storage location (e.g., a URL) at which the accessory device may acquire the supplemental content. In some instances, this operation may include, at 1118(1), publishing the identifier provided by the device and information regarding the initial speech of the user to an event bus or other location and, at 1118(2), identifying the supplemental content based on this information. That is, as described above with reference to FIG. 6, the accessory component may monitor the event bus 610 to identify events for which to cause accessory device(s) to output supplemental content, and may identify the content to output (or a location corresponding to the content).

At 1120, in this example the remote system 112 generates high-frequency audio data that encodes the supplemental content or information for identifying and/or acquiring the supplemental content. That is, the remote system 112 may generate third audio data having a frequency that is inaudible to a human user (e.g., over 20,000 Hz) and that uses FSK or other techniques to encode the supplemental content or information for identifying the supplemental content. At 1122, the remote system 112 sends the second audio data, the primary content or information for acquiring the primary content (if different than the second audio data), and the third, high-frequency audio data to the device 104, which receives this information at 1124. At 1126, the device 104 outputs the second audio data and the primary content (if different than the second audio data). In some instances, outputting the primary content includes identifying the storage location (e.g., URL) received from the remote system 112, retrieving the primary content from the storage location, and outputting the retrieved content. At 1126, the device 104 also outputs the third, high-frequency audio data. At 1128, the accessory device generates fourth audio data based on audio captured by microphone(s) of the accessory device.

FIG. 13 concludes the process 1100 and includes, at 1130, the accessory device 106 identifying the instructions to output the supplemental content by analyzing the fourth audio data. At 1132, the accessory device 106 outputs the supplemental content. This may include referencing the tone-to-content map 940 to identify the locally stored content to output based on the information encoded in the third audio data. In another example, the accessory device identifies a storage location (e.g., URL) of the supplemental content, retrieves the supplemental content, and outputs the supplemental content in the environment.

Figure 14:
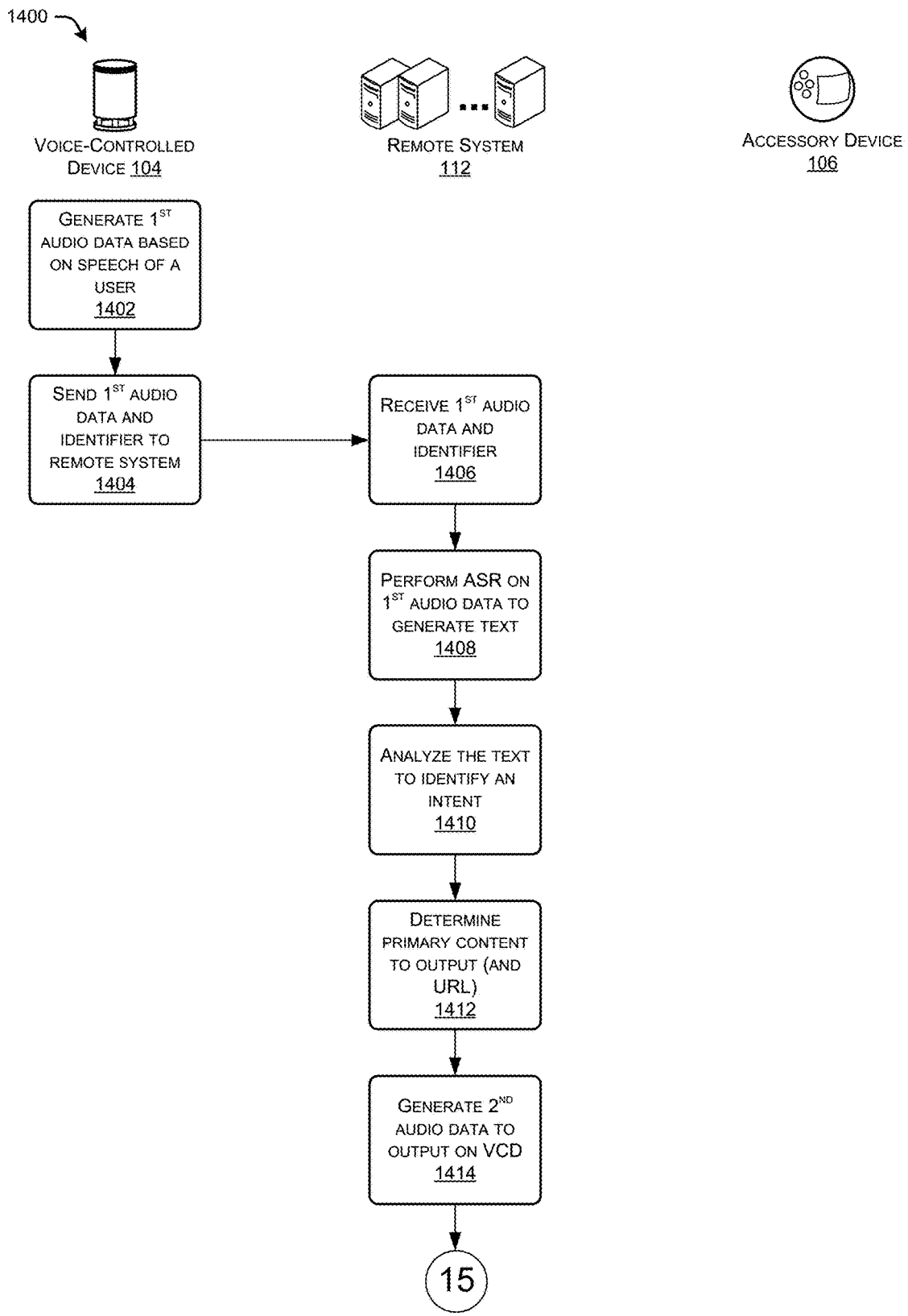
FIGS. 14-15 collectively illustrate an example process for causing an accessory device to output supplemental content in an environment at an offset relative to a position within primary content output by a primary device.
Figure 15:
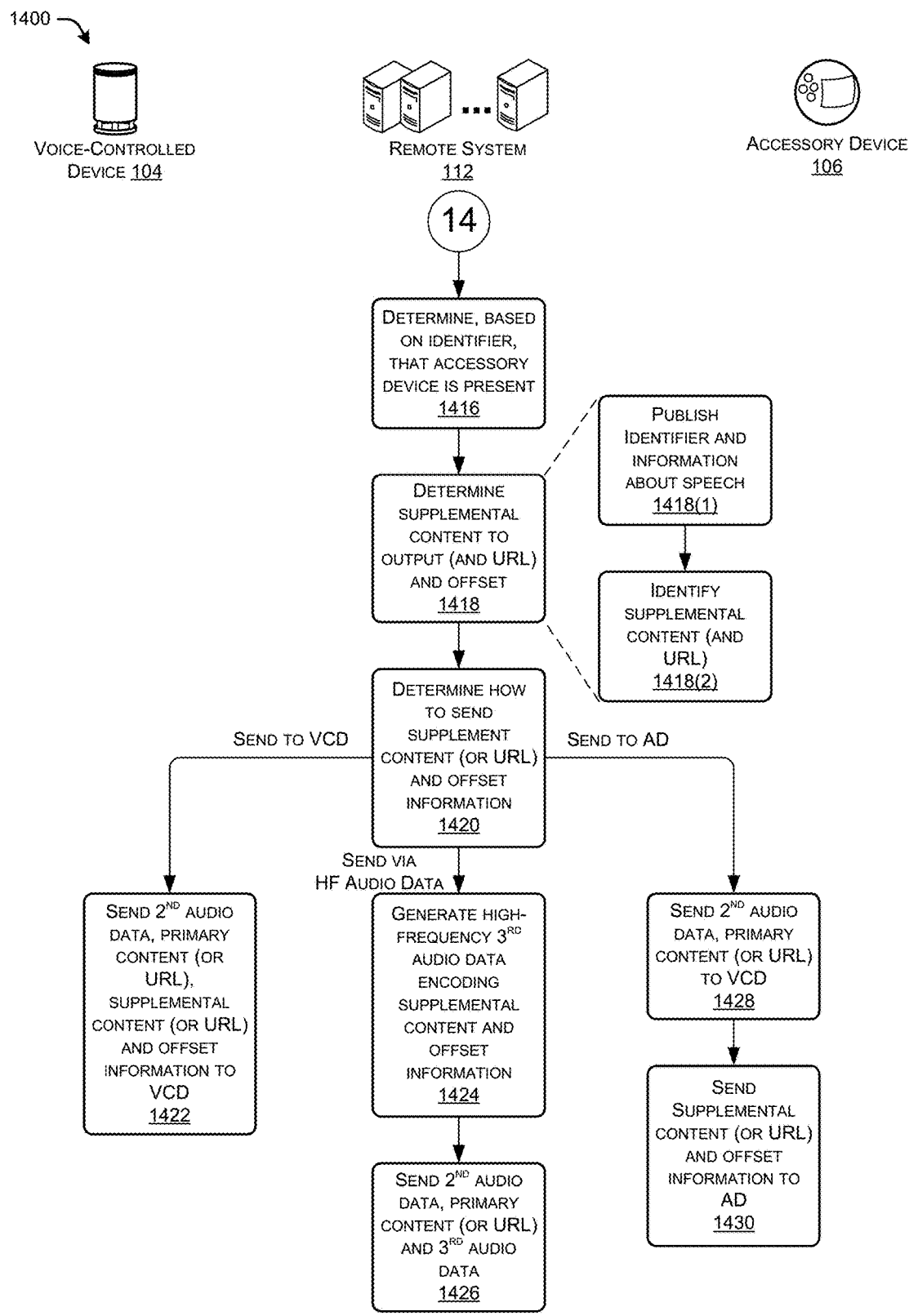

FIGS. 14-15 collectively illustrate an example process 1400 for causing an accessory device to output supplemental content in an environment at an offset relative to a position within primary content output by a primary device. At 1402, a primary device, such as the device 104, generates first audio data based on speech of a user. At 1404, the device 104 sends this first audio data and an identifier (e.g., an identifier of the device 104 or a user associated with the device 104) over the network to the remote system, which receives this information at 1106. At 1408, the remote system performs ASR on the first audio data to generate text and, at 1410, analyzes the text to identify a domain and/or an intent associated with the text. For instance, if the text was: "what is the weather today?", the remote system may determine that the text is associated with the "weather" domain and the intent corresponds to a "current weather" intent.

At 1412, the remote system 112 determines primary content to output on the device 104 or another device in the environment based on the domain and/or intent. Additionally or alternatively, the remote system 112 may determine a storage location (e.g., a URL) for acquiring the primary content, such as a URL corresponding to a third-party weather application that is configured to output audio data corresponding to the day's weather at the location associated with the device. At 1414, the remote system may generate second audio data to output on the device or another device in the environment. The second audio data may comprise the primary content itself (e.g., the day's weather forecast), or additional data (e.g., an introduction such as "here is today's weather"), which may be followed by the primary content available at the storage location.

FIG. 15 continues the illustration of the process 1400 and includes, at 1416, the remote system 112 determining, based on the identifier received from the device 104, that at least one accessory device is present in the environment of the device 104. That is, the accessory component 130 may have identified a user account of profile associated with the device and may have determined a particular accessory device having been registered with the account. Further, the user profile may indicate that the accessory device has been seen recently by the device 104.

At 1418, the remote system determines supplemental content to output on the accessory device, and/or a storage location (e.g., a URL) at which the accessory device may acquire the supplemental content. In some instances, this operation may include, at 1418(1), publishing the identifier provided by the device and information regarding the initial speech of the user to an event bus or other location and, at 1418(2), identifying the supplemental content based on this information. That is, as described above with reference to FIG. 6, the accessory component may monitor the event bus 610 to identify events for which to cause accessory device(s) to output supplemental content, and may identify the content to output (or a location corresponding to the content).

At 1420, the remote system 112 determines how to send the supplemental content (or information for identifying/acquiring the supplemental content) to the accessory device. That is, the accessory component 130 may determine, based on a device type and/or capabilities of the particular accessory device, how to instruct the accessory device to output the supplemental content. In instances where the accessory device is able to communicate over a network with the remote system 112 directly (the "send to AD" branch), the process 1400 proceeds to send the 2$^{nd}$ audio data and the primary content (if different) to the device 104 at 1428, while sending the supplemental content (or information for identifying/acquiring the supplemental content) to the accessory device at 1430. In this example, the remote system 112 also sends the offset information directly to the accessory device, such that the accessory device 106 outputs the supplemental content at a predefined offset relative to a position in the primary content.

In some instances, meanwhile, the remote system 112 may determine to send the entirety of the information to the device 104, such that the device 104 is able to pass along a portion of the information to the accessory device 106. In this example, the process 1400 proceeds (along the "Send to VCD") to operation 1422, which represents the remote system 112 sending the second audio data, the primary content (if different than the second audio data), and the supplemental content to the device 104. The device 104 may then send the supplemental content (or information for identifying the supplemental content) to the accessory device over a short-range wireless communication network. Again, the remote system 112 may also send the offset information to the device 104, which may send this information along with the supplemental content to the accessory device over the short-range network.

Finally, in some instances the remote system 112 may determine to encode the supplemental content (or information for identifying/acquiring the supplemental content) into data, such as high-frequency audio data. In this instance, the process 1400 proceeds (along the "send via HF audio data" branch) to operation 1424, which represents the remote system generating third, high-frequency audio data that includes the supplemental information and the offset information (or information for acquiring this data). At 1426, the remote system 112 then sends the second audio data, the primary content (if different from the second audio data), and the third, high-frequency audio data to the device 104. The device 104 then outputs the third, high-frequency audio data in the environment, such that the accessory device identifies the instructions to output the supplemental content.

Figure 16:
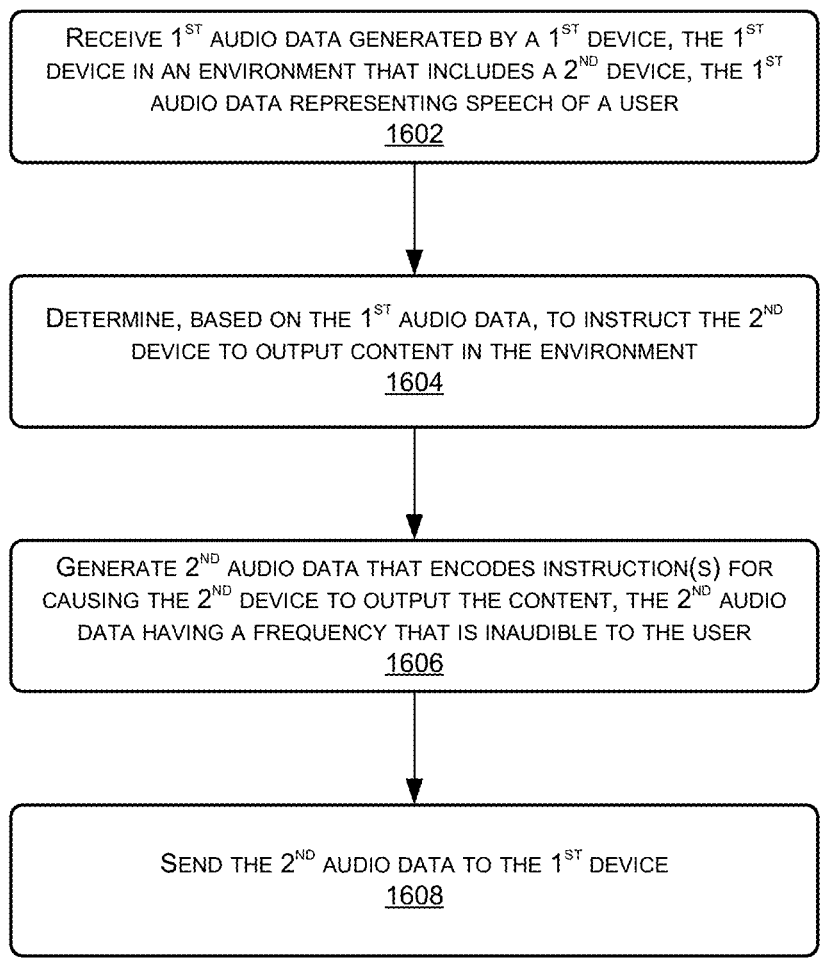
FIG. 16 illustrates a flow diagram of an example process for encoding data in high-frequency audio data. The encoded data may comprise instructions to cause an accessory device to output supplemental content.

FIG. 16 illustrates a flow diagram of an example process 1600 for encoding data in high-frequency audio data. At 1602, the process 1600 receives first audio data generated by a first device, with the first device residing in an environment that also includes a second device. In some instances, the first audio data represents speech of a user in the environment. At 1604, the process 1600 determines, based on the first audio data, to instruct the second device in the environment to output content in the environment. For example, the accessory component 130 described above may determine, based on the first audio data, to instruct an accessory device in an environment to output certain content.

At 1606, the process 1600 generates second audio data that encodes instructions for causing the second device to output the content. In some instances, the second audio data has a frequency that is inaudible to the user in the environment. At 1608, the process 1600 sends the second audio data to the first device, for output by the first device. In response to the first device outputting the second audio data, the second device may generate third audio data, analyze the third audio data, and identify the instructions to output the content. The second device may then retrieve (locally or remotely) the content and output the content.

FIG. 17 illustrates a flow diagram of an example process 1700 for causing an accessory device to output supplemental content in an environment at an offset relative to a position within primary content output by a primary device. At 1702, the process 1700 receives first audio data generated by a first device, with the first device residing in an environment that also includes a second device. In some instances, the first audio data represents speech of a user in the environment. At 1704, the process 1700 determines, based on the first audio data, to instruct the first device to output first content in the environment. For instance, the process 1700 may determine to answer a query of the user, cause the first device to output a requested song, or the like. At 1706, meanwhile, the process 1700 determines to cause the second device to output second content in the environment at an offset relative to a position in the first content. For instance, the process 1700 may determine to cause the second device to output content that supplements the first content in a manner that is coordinated in time with the first content. For example, the second content may comprise the sounds or images described above with reference to FIG. 1, a dialogue provided by the second device that interjects a predefined point during output of the first content by the first device, or the like.

At 1708, the process 1700 causes the first device to output the first content. For example, the remote system 112 may send the first content to the first device or may send information for acquiring the first content to the first device. At 1710, the process 1700 may cause the second device to output the second content. Again, the remote system 112 may send the second content directly to the second device, to the first device for sending along to the second device, or by encoding instructions to output the second content into high-frequency audio data or the like.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving first audio data generated by a microphone of a device, the device residing in an environment that includes an accessory device, the first audio data representing speech of a user in the environment;
receiving an identifier associated with the device;
performing automatic speech recognition (ASR) on the first audio data to generate text representing the speech of the user;
analyzing the text to identify an intent associated with the text;
determining a uniform resource locator (URL) for acquiring primary content based at least in part on the intent associated with the text;
generating second audio data for output on a speaker of the device based at least in part on the intent associated with the text, the second audio data introducing the primary content;
sending the URL to the device;
sending the second audio data to the device for output on the speaker of the device;
determining, based at least in part on the identifier associated with the device, that the accessory device resides in the environment with the device;
identifying supplemental content to output on the accessory device, the supplemental content being associated with the primary content;
generating third audio data for output on the speaker of the device, the third audio data having a frequency of at least 20 kHz such that the third audio data is inaudible to the user, the third audio data encoding information identifying the supplemental content; and
sending the third audio data to the device for output on the speaker of the device.

2. The method as recited in claim 1, further comprising:
publishing, to an event bus, information associated with at least one of the first audio data or second audio data;
publishing the identifier associated with the device to the event bus; and
identifying the information and the device identifier associated with the device; and
wherein the identifying the supplemental content comprises identifying the supplemental content to output on the accessory device based at least in part on the identifying the information and the identifier, the supplemental content being associated with the primary content via metadata of the primary content.

3. The method as recited in claim 1, wherein the identifying the supplemental content comprises identifying at least one of audible content to output on the accessory device, one or more images to output on the accessory device, one or more lights of the accessory device to turn on, or one or more lights of the accessory device to turn off.

4. A method comprising:
receiving first audio data from a first device, the first device residing in an environment that includes the first device and a second device, the first audio data representing speech of a user in the environment;
determining, based at least in part on the first audio data, to instruct the second device to output content in the environment;
generating second audio data representing first audio and second audio, wherein:
the first audio has a frequency below 20 kHz; and
the second audio has a frequency of at least 20 kHz and represents one or more instructions for causing the second device to output the content in the environment; and
sending the second audio data to the first device for output on one or more speakers of the first device.

5. The method as recited in claim 4, further comprising:
receiving an identifier associated with the first device; and
determining, using the identifier, that the second device is in the environment with the first device; and
wherein the determining to instruct the second device to output the content comprises determining to instruct the second device to output the content based at least in part on the first audio data and on the determining that the second device is in the environment with the first device.

6. The method as recited in claim 4, further comprising:
determining a device type of the second device; and
determining, based at least in part on the device type of the second device, to send the second audio data to the first device.

7. The method as recited in claim 4, wherein the content comprises first content, and the one or more instructions comprises one or more first instructions, the method further comprising:
determining, based at least in part on the first audio data, to instruct a third device in the environment to output second content;
determining a device type of the third device; and
sending, based at least in part on the device type of the third device, one or more second instructions to the third device over a network, the one or more second instructions for causing the third device to output the second content.

8. The method as recited in claim 4, wherein:
the generating the second audio data comprises generating the second audio data that encodes the one or more instructions for causing the second device to output the content in the environment, the one or more instructions specifying a network location for acquiring the content;
receiving, from the second device, a request for the content, the request specifying the network location; and
sending the content to the second device.

9. The method as recited in claim 4, wherein the generating the second audio data comprises generating the second audio data that encodes the one or more instructions for causing the second device to output the content in the environment, the one or more instructions specifying a routine on the second device to execute, the routine stored locally on the second device.

10. The method as recited in claim 4, further comprising:
performing automatic speech recognition (ASR) on the first audio data to generate text representing the speech of the user;
analyzing the text to identify an intent associated with the text;
generating, based at least in part on the intent associated with the text, third audio data or information for acquiring the third audio data for output on one or more speakers of the first device; and
sending the third audio data or the information for acquiring the third audio data to the first device for output on the one or more speakers of the first device, and wherein the content for output on the second device is supplemental to the third audio data for output on the one or more speakers of the first device.

11. The method as recited in claim 10, wherein the sending the second audio data and the sending the third audio data comprises sending the second audio data to the first device such that at least a portion of the second audio is output in the environment at a same time as at least a portion of the third audio data.

12. The method as recited in claim 4, further comprising:
determining a device type of the second device;
determining information associated with the speech of the user; and
identifying the content for output by the second device based at least in part on the device type of the second device and on the information associated with the speech of the user.

13. A device comprising:
one or more microphones;
one or more speakers;
one or more processors; and
one or more computer-readable media storing computer-executable instructions that, when executed, cause the one or more processors to perform acts comprising:
generating first audio data based at least in part on speech of a user in an environment, the speech captured by the one or more microphones;
sending the first audio data to one or more remote computing devices;
receiving, from the one or more remote computing devices, second audio data for output by the one or more speakers, the second audio data including:
first audio representing audio that is below 20 kHz, and
second audio representing audio that is above 20 kHz, the second audio comprising one or more instructions for instructing an accessory device in the environment to acquire supplemental content; and
outputting the second audio data by the one or more speakers, the second audio data including the first audio for the user to hear and the second audio for instructing the accessory device.

14. The device as recited in claim 13, wherein the outputting the second audio data comprises outputting the second audio data such that at least part of the second audio is output synchronously with at least part of the first audio.

15. The device as recited in claim 13, wherein the outputting the second audio data comprises outputting the first audio prior to or after the second audio of the second audio data.

16. The device as recited in claim 13, wherein the outputting the second audio data comprises outputting the second audio data to cause the accessory device to acquire content for output in the environment by requesting the content from a specified network location.

17. The device as recited in claim 13, wherein the outputting the second audio data comprises outputting the second audio data to cause the accessory device to acquire supplement content that is stored locally on the accessory device.

18. The device as recited in claim 13, wherein the receiving the second audio data comprises receiving a signal audio file that includes the first audio and the second audio.

19. The device as recited in claim 13, wherein speech comprises first speech and the one or more instructions comprising one or more first instructions, the acts further comprising:
generating third audio data based at least in part on second speech of the user in the environment, the second speech captured by the one or more microphones;
sending the third audio data to the one or more remote computing devices;
receiving, from the one or more remote computing devices, fourth audio data for output by the one or more speakers;
receiving, from the one or more remote computing devices, fifth data for sending to the accessory device, the data comprising one or more second instructions for the accessory device;
outputting the fourth audio data on the one or more speakers; and
sending the fifth data to the accessory device of a wireless personal area network (WPAN).

20. The method of claim 1, wherein the third audio data further comprises an offset time at which the accessory device is to output the supplemental content relative to the primary content.

* * * * *